(12) United States Patent
Campbell et al.

(10) Patent No.: US 9,587,958 B2
(45) Date of Patent: Mar. 7, 2017

(54) MOBILE DEVICE GATEWAY SYSTEMS AND METHODS

(75) Inventors: Douglas C. Campbell, Northville, MI (US); Richard J. Chutorash, Oakland Township, MI (US); Brian L. Douthitt, Holland, MI (US); Rodger W. Eich, Holland, MI (US); James B. Price, Holland, MI (US); Mark Zeinstra, Holland, MI (US); Philip J. Vanderwall, Marne, MI (US); Elisabet A. Anderson, Holland, MI (US); Michael J. Sims, Zeeland, MI (US); Mike Davis, Holland, MI (US); Ted W. Ringold, Hudsonville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 359 days.

(21) Appl. No.: 12/524,154

(22) PCT Filed: Jan. 7, 2008

(86) PCT No.: PCT/US2008/050436
§ 371 (c)(1),
(2), (4) Date: Sep. 11, 2009

(87) PCT Pub. No.: WO2008/091727
PCT Pub. Date: Jul. 31, 2008

(65) Prior Publication Data
US 2010/0097239 A1    Apr. 22, 2010

Related U.S. Application Data

(60) Provisional application No. 60/889,212, filed on Feb. 9, 2007, provisional application No. 60/881,953, filed on Jan. 23, 2007.

(51) Int. Cl.
*H04W 4/14* (2009.01)
*G01C 21/36* (2006.01)
(Continued)

(52) U.S. Cl.
CPC ...... *G01C 21/3688* (2013.01); *B60R 11/0252* (2013.01); *B60R 11/0258* (2013.01);
(Continued)

(58) Field of Classification Search
USPC .................................................. 340/825.25
See application file for complete search history.

(56) References Cited

U.S. PATENT DOCUMENTS 4,390,877 A    6/1983  Curran
4,760,394 A    7/1988  Takeuchi et al.
(Continued)

FOREIGN PATENT DOCUMENTS

EP    0 660 542 A1    6/1995
EP    1 052 609 B1    11/2000
(Continued)

OTHER PUBLICATIONS

Office Action for European Patent Application No. 07 869 539.2, dated Jun. 25, 2010, 5 pages.
(Continued)

*Primary Examiner* — Fekadeselassie Girma
*Assistant Examiner* — Cal Eustaquio
(74) *Attorney, Agent, or Firm* — Foley & Lardner LLP

(57) ABSTRACT

A control system (106) for mounting to a vehicle (100) and for providing information to an occupant of the vehicle from a first source device (116) is provided. The vehicle includes an audio system (130) and/or a display system (100). The control system includes a first interface (120) for communicating with the first source device (116). The control system further includes a second interface for providing a
(Continued)

signal to the audio system and/or the display system. The control system yet further includes a processor (122). A memory unit (122) is communicably connected to the processor and includes a first transport (2112) configured to send a control signal to the interface. The memory unit (132) further includes a first manager (2304) configured to receive a command from an application (2104) and to translate the command from the application (2104) into a command for the transport (2112).

10 Claims, 24 Drawing Sheets

(51) Int. Cl.
  *B60R 11/02* (2006.01)
  *H04M 1/60* (2006.01)
  *H04L 29/08* (2006.01)
  *B60R 11/00* (2006.01)
  *H04L 29/06* (2006.01)

(52) U.S. Cl.
  CPC .......... *G01C 21/3661* (2013.01); *H04L 67/12* (2013.01); *H04M 1/6083* (2013.01); *B60R 2011/0005* (2013.01); *B60R 2011/0007* (2013.01); *B60R 2011/0091* (2013.01); *H04L 65/1036* (2013.01)

(56) References Cited

U.S. PATENT DOCUMENTS

| | | | |
|---|---|---|---|
| 4,792,796 A | 12/1988 | Bradshaw et al. | |
| 4,825,200 A | 4/1989 | Evans et al. | |
| 4,827,520 A | 5/1989 | Zeinstra | |
| 5,113,182 A | 5/1992 | Suman et al. | |
| 5,278,547 A | 1/1994 | Suman et al. | |
| 5,475,366 A | 12/1995 | Van Lente et al. | |
| 5,479,155 A | 12/1995 | Zeinstra et al. | |
| 5,479,157 A | 12/1995 | Suman et al. | |
| 5,583,485 A | 12/1996 | Van Lente et al. | |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,455 A | 8/1997 | Van Lente et al. | |
| 5,691,848 A | 11/1997 | Van Lente et al. | |
| 5,699,044 A | 12/1997 | Van Lente et al. | |
| 5,708,415 A | 1/1998 | Van Lente et al. | |
| 5,717,387 A | 2/1998 | Suman et al. | |
| 5,854,593 A | 12/1998 | Dykema et al. | |
| 5,903,226 A | 5/1999 | Suman et al. | |
| 5,907,796 A | 5/1999 | Matchett et al. | |
| 5,926,087 A | 7/1999 | Busch et al. | |
| 6,010,403 A | 1/2000 | Adam et al. | |
| 6,020,654 A | 2/2000 | Chutorash | |
| 6,028,537 A | 2/2000 | Suman et al. | |
| 6,067,681 A | 5/2000 | Zeinstra et al. | |
| 6,144,114 A | 11/2000 | Chutorash | |
| 6,154,148 A | 11/2000 | Fluharty et al. | |
| 6,181,255 B1 | 1/2001 | Crimmins et al. | |
| 6,188,889 B1 | 2/2001 | Tsai | |
| 6,212,474 B1 | 4/2001 | Fowler et al. | |
| 6,282,152 B1 | 8/2001 | Kurple | |
| 6,282,407 B1 | 8/2001 | Vega et al. | |
| 6,336,031 B1 | 1/2002 | Schyndel | |
| 6,374,182 B2 | 4/2002 | Bechtolsheim et al. | |
| 6,430,164 B1 | 8/2002 | Jones et al. | |
| 6,472,771 B1 | 10/2002 | Frese et al. | |
| 6,539,358 B1 | 3/2003 | Coon et al. | |
| 6,556,813 B2 | 4/2003 | Tsui | |
| 6,584,319 B1 | 6/2003 | Girod | |
| 6,603,405 B2 | 8/2003 | Smith | |
| 6,611,358 B1 | 8/2003 | Narayanaswamy | |
| 6,615,023 B1 | 9/2003 | Ehrensvard | |
| 6,697,638 B1 | 2/2004 | Larsson et al. | |
| 6,771,749 B1 | 8/2004 | Bansal et al. | |
| 6,825,751 B1 | 11/2004 | Kita et al. | |
| 6,978,126 B1 | 12/2005 | Blaker et al. | |
| 6,985,934 B1 | 1/2006 | Armstrong et al. | |
| 7,050,593 B1 | 5/2006 | Emerling et al. | |
| 7,050,834 B2 | 5/2006 | Harwood et al. | |
| 7,110,537 B2 | 9/2006 | Mazzara, Jr. | |
| 7,116,229 B1 | 10/2006 | Miramontes | |
| 7,228,211 B1 | 6/2007 | Lowrey et al. | |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,516,072 B2 | 4/2009 | Campbell et al. | |
| 7,564,377 B2 | 7/2009 | Kimchi et al. | |
| 7,689,253 B2 | 3/2010 | Basir | |
| 7,787,907 B2 | 8/2010 | Zeinstra et al. | |
| 8,064,575 B1 | 11/2011 | Dhanoa et al. | |
| 8,103,445 B2 | 1/2012 | Smith et al. | |
| 8,161,116 B2 | 4/2012 | Chaddha et al. | |
| 8,413,038 B2 | 4/2013 | Lim et al. | |
| 8,447,598 B2 | 5/2013 | Chutorash et al. | |
| 2001/0033225 A1 | 10/2001 | Razavi et al. | |
| 2001/0056470 A1 | 12/2001 | Ishitani | |
| 2002/0032510 A1 | 3/2002 | Turnbull et al. | |
| 2002/0040271 A1 | 4/2002 | Park et al. | |
| 2002/0054159 A1 | 5/2002 | Obradovich | |
| 2002/0123325 A1 | 9/2002 | Cooper | |
| 2002/0169584 A1 | 11/2002 | Fu et al. | |
| 2003/0079035 A1 | 4/2003 | Boyd et al. | |
| 2003/0096593 A1 | 5/2003 | Naboulsi | |
| 2003/0114202 A1 | 6/2003 | Suh et al. | |
| 2003/0156097 A1 | 8/2003 | Kakihara et al. | |
| 2003/0179871 A1 | 9/2003 | Ito et al. | |
| 2003/0210796 A1* | 11/2003 | McCarty et al. | 381/81 |
| 2003/0236818 A1 | 12/2003 | Bruner et al. | |
| 2004/0054468 A1 | 3/2004 | Yamada et al. | |
| 2004/0073356 A1 | 4/2004 | Craine | |
| 2004/0073361 A1 | 4/2004 | Tzamaloukas et al. | |
| 2004/0104842 A1 | 6/2004 | Drury et al. | |
| 2004/0198389 A1 | 10/2004 | Alcock et al. | |
| 2004/0203919 A1 | 10/2004 | Ross et al. | |
| 2004/0242216 A1 | 12/2004 | Boutsikakis | |
| 2005/0005298 A1 | 1/2005 | Tranchina | |
| 2005/0014531 A1 | 1/2005 | Findikli | |
| 2005/0015197 A1 | 1/2005 | Ohtsuji et al. | |
| 2005/0024264 A1 | 2/2005 | Harrison | |
| 2005/0053008 A1 | 3/2005 | Griesing et al. | |
| 2005/0165513 A1 | 7/2005 | Obradovich | |
| 2005/0197747 A1 | 9/2005 | Rappaport et al. | |
| 2005/0197767 A1 | 9/2005 | Nortrup | |
| 2005/0208968 A1 | 9/2005 | Codeville | |
| 2005/0210507 A1* | 9/2005 | Hawkins | G06F 17/30035 725/46 |
| 2005/0239434 A1* | 10/2005 | Marlowe | 455/345 |
| 2005/0242970 A1 | 11/2005 | Blaker et al. | |
| 2005/0245272 A1 | 11/2005 | Spaur et al. | |
| 2006/0017612 A1 | 1/2006 | Nagatani | |
| 2006/0129636 A1 | 6/2006 | Matsuura et al. | |
| 2006/0135064 A1 | 6/2006 | Cho et al. | |
| 2006/0136122 A1 | 6/2006 | Fraser et al. | |
| 2006/0158344 A1 | 7/2006 | Bambini et al. | |
| 2006/0214813 A1 | 9/2006 | Witkowski et al. | |
| 2006/0232376 A1 | 10/2006 | Blaker | |
| 2006/0232377 A1 | 10/2006 | Witkowski | |
| 2007/0054702 A1 | 3/2007 | Rokusek et al. | |
| 2007/0057810 A1 | 3/2007 | Bos et al. | |
| 2007/0123191 A1 | 5/2007 | Simpson | |
| 2007/0132635 A1 | 6/2007 | Dockemeyer et al. | |
| 2007/0143798 A1 | 6/2007 | Jira et al. | |
| 2007/0152798 A1 | 7/2007 | Witkowski | |
| 2007/0197172 A1 | 8/2007 | Witkowski et al. | |
| 2007/0210905 A1 | 9/2007 | Battista | |
| 2007/0213092 A1 | 9/2007 | Geelen | |
| 2007/0225898 A1 | 9/2007 | Pfleging et al. | |
| 2007/0252689 A1 | 11/2007 | Rothschild | |
| 2008/0027643 A1 | 1/2008 | Basir et al. | |

(56) References Cited

U.S. PATENT DOCUMENTS

| | | | |
|---|---|---|---|
| 2008/0068205 | A1 | 3/2008 | Witkowski |
| 2008/0188180 | A1 | 8/2008 | Rahja |
| 2008/0192659 | A1 | 8/2008 | Santavicca |
| 2008/0215524 | A1 | 9/2008 | Fuchs et al. |
| 2008/0221742 | A1 | 9/2008 | DiCroce |
| 2008/0244050 | A1 | 10/2008 | Wong et al. |
| 2009/0085728 | A1 | 4/2009 | Catten et al. |
| 2010/0100310 | A1 | 4/2010 | Eich et al. |
| 2011/0257973 | A1 | 10/2011 | Chutorash et al. |
| 2012/0072096 | A1 | 3/2012 | Chapman et al. |
| 2014/0100740 | A1 | 4/2014 | Chutorash et al. |

FOREIGN PATENT DOCUMENTS

| | | |
|---|---|---|
| EP | 1 267 111 A1 | 12/2002 |
| EP | 1 304 695 A2 | 4/2003 |
| EP | 1 338 866 A2 | 8/2003 |
| EP | 1 357 358 A1 | 10/2003 |
| EP | 1 058 220 B1 | 2/2004 |
| EP | 1 387 145 A1 | 2/2004 |
| EP | 1568834 A1 | 8/2005 |
| EP | 1 655 677 A2 | 5/2006 |
| EP | 1698518 A2 | 9/2006 |
| EP | 1 493 994 B1 | 8/2007 |
| EP | 1 959 410 A1 | 8/2008 |
| EP | 1 560 200 B1 | 11/2008 |
| GB | 2 375 397 B | 5/2004 |
| JP | 01-290032 A | 11/1989 |
| JP | 2001-282691 A | 10/2001 |
| JP | 2001-297527 A | 10/2001 |
| JP | 2001-304875 A | 10/2001 |
| JP | 2001-325221 A | 11/2001 |
| JP | 2002-027386 | 1/2002 |
| JP | 2002-087183 A | 3/2002 |
| JP | 2002-169584 A | 6/2002 |
| JP | 2002-171217 A | 6/2002 |
| JP | 2003-150505 A | 5/2003 |
| JP | 2003-244343 A | 8/2003 |
| JP | 2003-304339 A | 10/2003 |
| JP | 2003-330856 | 11/2003 |
| JP | 2004-153660 A | 5/2004 |
| JP | 2005-236560 A | 9/2005 |
| JP | 2005-284886 A | 10/2005 |
| JP | 2006-033377 A | 2/2006 |
| JP | 2006-349405 A | 2/2006 |
| JP | 2006-319727 A | 11/2006 |
| JP | 2006-321470 A | 11/2006 |
| JP | 2007-256137 A | 10/2007 |
| WO | WO-00/75905 A1 | 12/2000 |
| WO | WO-01/67413 A1 | 9/2001 |
| WO | WO-2004/043750 A2 | 5/2004 |
| WO | WO-2004/077729 A2 | 9/2004 |
| WO | WO-2005/002080 A1 | 1/2005 |
| WO | WO 2006/063602 A1 | 6/2006 |
| WO | WO 2007/123798 A1 | 11/2007 |
| WO | WO-2008/079811 A1 | 7/2008 |
| WO | WO 2008/079889 A2 | 7/2008 |
| WO | WO 2008/079891 A2 | 7/2008 |
| WO | WO 2008/091727 A1 | 7/2008 |
| WO | WO 2009/073806 A2 | 6/2009 |

OTHER PUBLICATIONS

International Search Report and Written Opinion for Application No. PCT/US2008/050436, dated Jun. 18, 2008, 9 pages.
Office Action for European Patent Application No. 07869543.4, dated Dec. 22, 2010, 6 pages.
Office Action for European Patent Application No. 07869543.4, dated Oct. 14, 2009, 3 pages.
International Search Report and Written Opinion for International Application No. PCT/US2007/088171, mailing date Jun. 27, 2008, 11 pages.
International Search Report and Written Opinion for International Application No. PCT/US2007/088175, mail date Sep. 19, 2008, 11 pages.
International Search Report and Written Opinion for International Patent Application No. PCT/US2008/085570, mailed Oct. 22, 2009, 17 pages.
Office Action for European Patent Application No. 08 705 741.0, dated Jan. 13, 2010, 3 pages.
International Search Report and Written Opinion for International Patent Appln. No. PCT/US2008/050436, mailed Jun. 18, 2008, 15 pages.
MpCar.com, "MP3Car Wiki," www.Mp3car.com, Jan. 12, 2007, 11 pages.
Japan Office Action dated May 15, 2012 as received in corresponding Japan Application No. 2009-543188 and its English Translation, 7 pages.
Japan Office Action dated May 15, 2012 as received in corresponding Japan Application No. 2009-547339 and its English Translation, 7 pages.
US Office Action dated Jun. 13, 2012 as received in corresponding U.S. Appl. No. 12/519,735.
Non-Final Office Action mailed Sep. 11, 2013, as received in co-pending U.S. Appl. No. 12/519,735.
Notice of Allowance mailed Oct. 8, 2013, as received in co-pending U.S. Appl. No. 12/780,779.
Dahn, et al., "Combinatorial Study of Sn1-xCox (0 <x <0.6) and [Sn0.55Co0.45]1-yCy (0 <y <0.5) Alloy Negative Electrode Materials for Li-Ion Batteries," Journal of Electrochemical Society, (2006), 153:A361-365.
Near Field Communication. (n.d.). Retrieved Dec. 7, 2012 from *Wikipedia, the free encyclopedia:* http://en.wikipedia.org/wiki/Near_Field_Communication (6 pages).
International Search Report and Written Opinion dated Jun. 11, 2010 as received in International Patent Application No. PCT/US2009/065855 (18 pages).
Non-Final Office Action dated Jul. 30, 2013 as received in U.S. Appl. No. 13/428,857 (27 pages).
Communication Pursuant to Article 94(3) EPC dated Dec. 14, 2009 as received in European Patent Application No. 04751431.0 (5 pages).
Notice of Reasons for Rejection dated Oct. 2, 2012 as received in Japanese Patent Application No. 2010-537078 and corresponding English language translation dated Nov. 15, 2012 (8 pages).
Final Notice of Reasons for Rejection dated Nov. 6, 2012 as received in Japanese Patent Application No. 2009-543188 and corresponding English language translation dated Dec. 6, 2012 (5 pages).
Invitation to Pay Additional Fees dated Mar. 19, 2010 as received in International Patent Application No. PCT/US2009/065855 (4 pages).
Written Opinion dated Oct. 15, 2004 as received in International Patent Application No. PCT/US2004/017058 (7 pages).
EP Communication for European Application No. 08 857 882 dated Sep. 13, 2013.
Final Notice of Reasons for Rejection mailed Oct. 29, 2013, as received in corresponding Japanese Patent Application No. 2010-537078, with English language translation of the same.
Final Office Action for U.S. Appl. No. 12/519,735 dated Apr. 9, 2014.
Office Action for Japanese Application No. 2013-160381 dated Jun. 10, 2014.
Office Action dated Aug. 21, 2014 received in U.S. Appl. No. 12/519,735.
Examination Report in corresponding European Application No. 08 857 882.8 dated Feb. 26, 2015, 4 pages.
Non-Final Office Action issued in U.S. Appl. No. 12/519,735 dated May 15, 2015.
Non-Final Office Action issued in U.S. Appl. No. 13/899,418 dated Mar. 26, 2015.
Final Office Action issued in U.S. Appl. No. 13/899,418 dated Oct. 9, 2015.
Final Office Action dated Nov. 2, 2015, in U.S. Appl. No. 12/519,735.

(56) References Cited

OTHER PUBLICATIONS

Office Action dated Mar. 10, 2016 in U.S. Appl. No. 13/899,418.
Notice of Allowance dated May 2, 2016, in U.S. Appl. No. 12/519,735.
Office Action on U.S. Appl. No. 13/899,418 DTD Oct. 18, 2016.

* cited by examiner

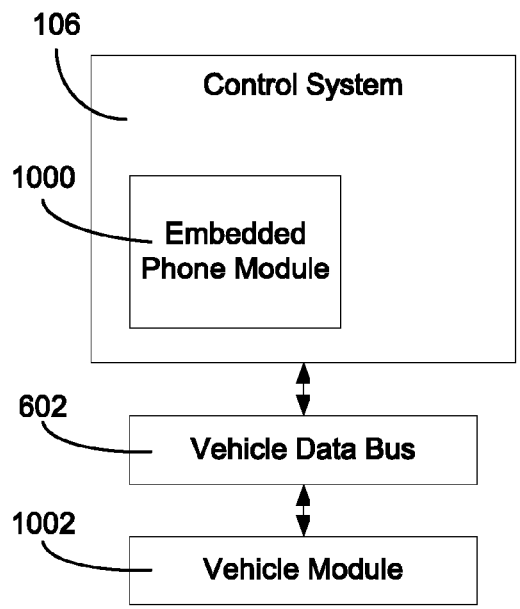
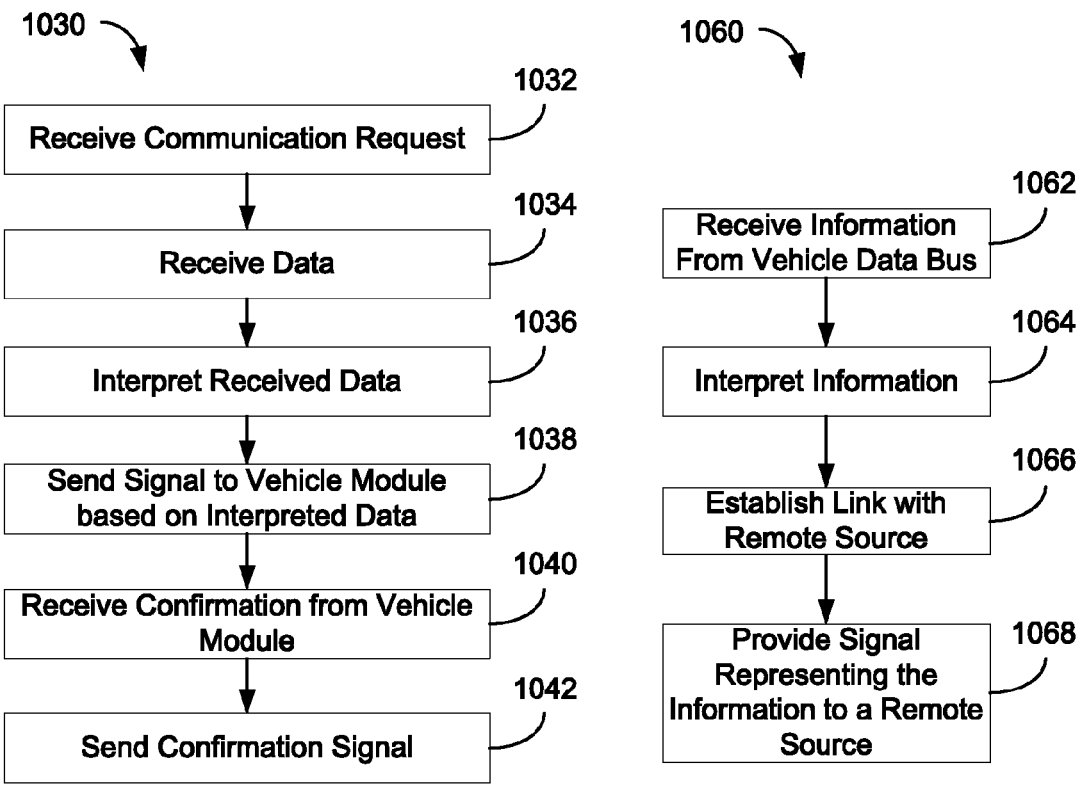
FIG. 10A
FIG. 10B
FIG. 10C

MOBILE DEVICE GATEWAY SYSTEMS AND METHODS

CROSS-REFERENCE TO RELATED PATENT APPLICATIONS

The present application claims the benefit of International Application No. PCT/US2008/050436 filed Jan. 7, 2008, which claims the benefit of U.S. Provisional Patent Application No. 60/889,212 filed Feb. 9, 2007 and U.S. Provisional Patent Application No. 60/881,953 filed Jan. 23, 2007, the entire disclosures of which are incorporated by reference herein.

BACKGROUND

The present application relates generally to the field of communication, navigation, and user control in a motor vehicle. The application relates more specifically to systems and methods for establishing and conducting communications between vehicle control systems and remote sources.

Vehicles typically include a number of electronics systems and subsystems such as an audio system, a mobile telephone system, a navigation system, a vehicle entertainment system, an engine management system that may be controlled by a user interface, an HVAC system, etc. One or more of these systems may include or be provided by a vehicle control system that may be setup in the vehicle. The control system may include a control interface and accompanying controls and may be configured to be coupled or integrated with other vehicle electronic systems, such as a display system or an audio system.

Conventional vehicles may have control systems that are relatively "stand alone" in that they do not communicate well with other vehicle systems or remote sources. For example, while some vehicle control systems may be configured to control an entertainment system or HVAC system, the control system may have limited connectivity to other vehicle systems or remote sources. When typical vehicle control systems are capable of communicating with a remote source, it is usually to accomplish a specific task with a single remote source. For example, some control systems may be able to conduct a hands-free mobile communications task with a cellular telephone. As remote sources such as personal digital assistants, mobile phones, portable media devices, and portable navigational devices have become more popular and important for business and personal use, it has become more desirable to increase connectivity and interactivity between remote sources and vehicle systems.

There is a need for a vehicle network gateway capable of facilitating multiple simultaneous data connections with a plurality of remote sources. Further, there is a need for a vehicle control system capable of serving as a vehicle network gateway for the plurality of connected remote sources and a vehicle data bus. Further, there is a need for a vehicle control system capable of facilitating the transfer of data from vehicle hardware modules to remote sources. Further, there is a need for a method of using a vehicle control system with a connection to a vehicle data bus and a plurality of remote sources to provide increased functionality to one or more connected remote sources. Further, there is a need for a method of using a vehicle control system connected to a plurality of remote sources to provide control system enhancements or features. Further, there is a need for a vehicle control system capable of accepting audio streamed from wired or wireless remote sources and outputting the audio through the vehicle audio system. Further, there is a need for a vehicle control system capable of accepting video streamed from wired or wireless remote sources and outputting the video through the vehicle display system. Further, there is a need for a vehicle control system having the ability to receive turn-by-turn directions from a personal navigation device over a wired or wireless connection and having the ability to send these directions to a vehicle audio system for playback. Further, there is a need for a vehicle control system having the ability to connect to an external memory device (e.g., USB memory drive), read media files from the memory device, decode media files from the memory device, and send audio to a vehicle audio system for playback. Further, there is a need for a vehicle control system having the ability to decode files from a connected media player and having the ability to play digital rights management (DRM) protected files. Further, there is a need for a vehicle control system having the ability to display and sort files stored on a connected remote source. Further, there is a need for a vehicle control system having the ability to access media files via voice command.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a control system for mounting to a vehicle and for providing information to an occupant of the vehicle from a first source device. The vehicle includes an audio system and/or a display system. The control system includes a first interface for communicating with the first source device. The control system further includes a second interface for providing a signal to the audio system and/or the display system. The control system yet further includes a processor. A memory unit is communicably connected to the processor and includes a first transport configured to send a control signal to the interface. The memory unit further includes a first manager configured to receive a command from an application and to translate the command from the application into a command for the transport.

The invention is capable of other embodiments and of being practiced or being carried out in various ways. Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which:

FIG. 10A is a block diagram of a control system coupled to a body control module, according to an exemplary embodiment;

FIG. 10B is a flow diagram of a method of communications between a remote device and a control system, according to an exemplary embodiment;

FIG. 10C is a flow diagram of a method of communications between a remote device and a control system, according to another exemplary embodiment;

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
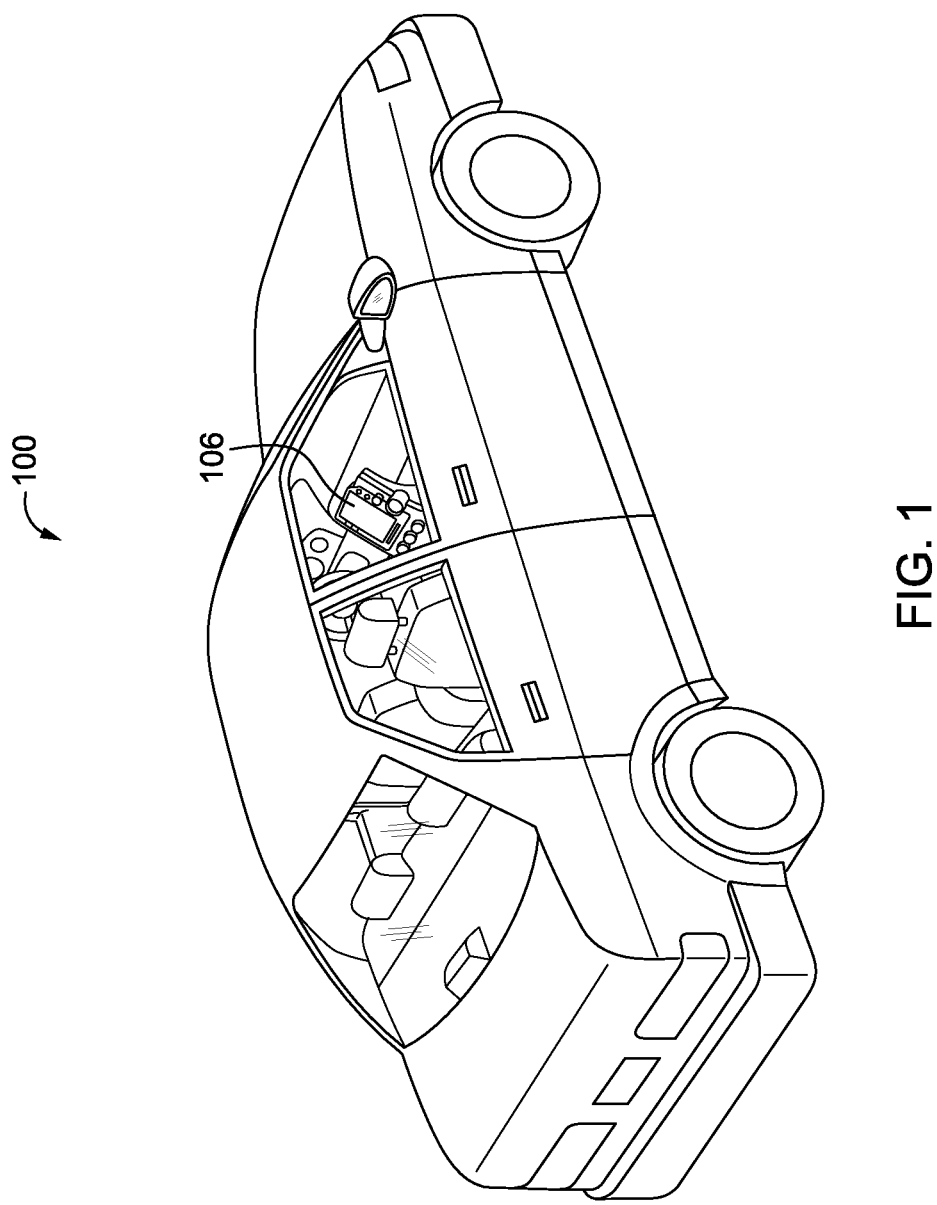
FIG. 1 is a perspective view of a motor vehicle that includes a number of vehicle systems, including a vehicle control system, according to one exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and a vehicle control system 106 (e.g., media system, navigational system, entertainment system, display system, communications systems, etc.). The HVAC system, sound system, and other systems may be coupled to vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of housing (in the case of vehicle 100) and interacting with vehicle control system 106.

Figure 2:
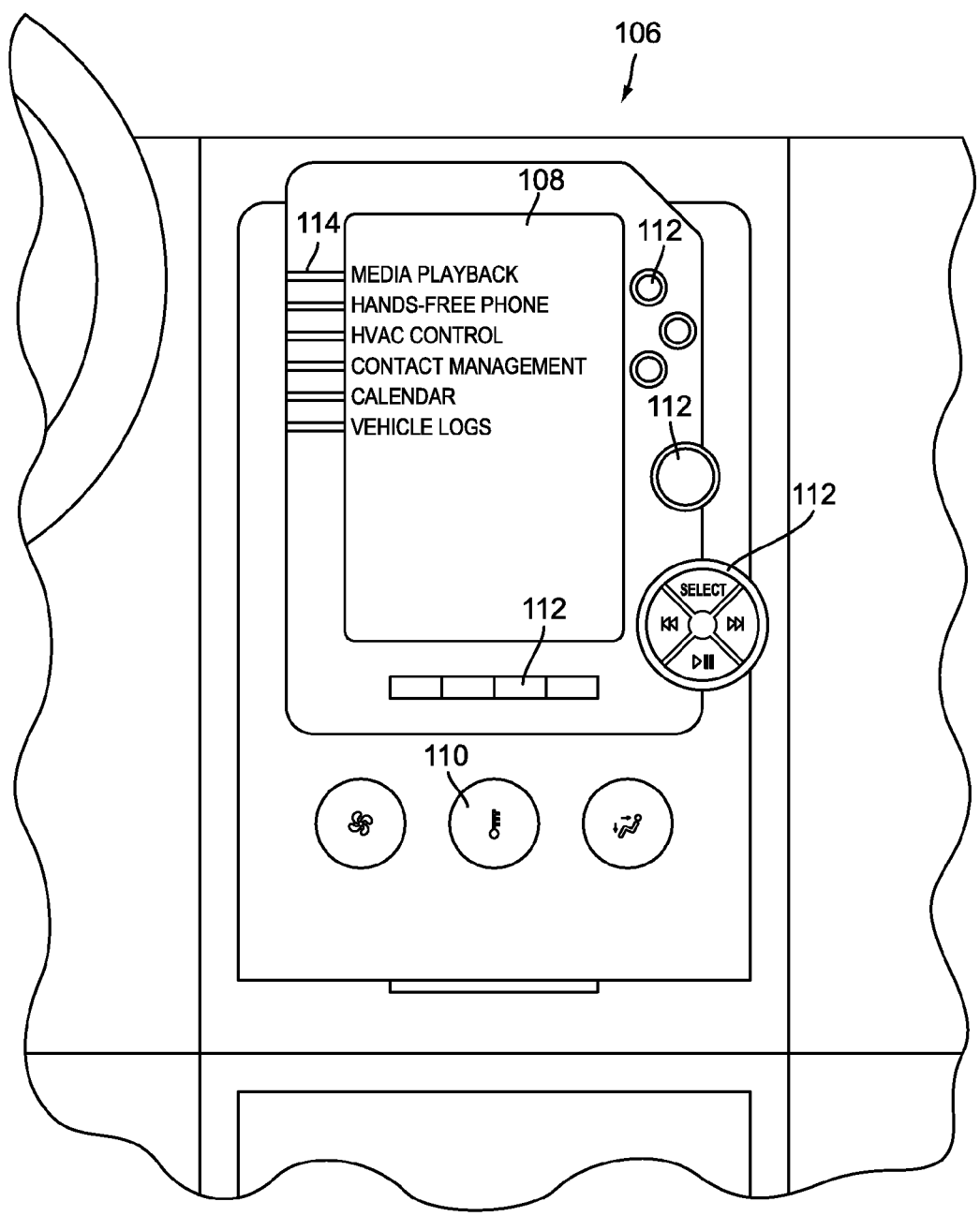
FIG. 2 is a front elevation view of the user interface of the vehicle control system of FIG. 1, according to an exemplary embodiment.

Referring to FIG. 2, one exemplary embodiment of vehicle control system 106 is shown. Vehicle control system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). The surface of the display may be curved in three dimensions or flat. Output display 108 may be a manufacturer installed output display, an aftermarket output display, or an output display from any source. Output display 108 may be an embedded display (e.g., a display embedded in the control system or other vehicle systems, parts, or structures), a standalone display (e.g., a portable display, a display mounted on a movable arm), or a display having any other configuration. Input knobs 110 and pushbuttons 112 and 114 may be configured to control functions of the HVAC system such as fan speed, cabin temperature, or routing of air flow, to control playback of media files over the sound system, to control retrieval of phonebook entries, to control a function of a connected remote source, or to control any other desired vehicle function.

It should be noted that pushbuttons 114 and/or other user interface elements (e.g., knobs 110) may be reconfigurable. The function of pushbuttons 114, for example, may be reconfigured to match the content on the screen. Accordingly, a user may be able to make selections with pushbuttons 114 specifically relating to an application making use of the display screen.

Pushbuttons 114 typically allow for the selection and display of various functions of vehicle control system 106 including sound system control, media system control, display system control, communications system control, hands-free phone use, HVAC system control, contact or address/phone book management, calendar viewing and modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect vehicle control system 106 to a mobile phone so that speaking into the vehicle console of vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit, and/or dial one or more entries containing personal contact information, by use of a tactile or oral command. The operation of pushbutton 114 for calendar management may display a menu screen or execute commands that allow the user to view, list, select, sort, search for, edit, and/or create one or more entries containing personal schedule information by tactile or oral command. The operation of pushbutton 114 for vehicle log management may display a menu screen or execute commands that allow the user to input, view, select and/or reset information related to the vehicle operation (e.g., fuel economy, engine temperature, distance to empty, etc.) by tactile or oral command. The operation of pushbutton 114 for controlling a mobile digital radio player (not illustrated in FIG. 2) may display a digital radio control menu screen or execute commands that allow the user to connect vehicle control system 106 and a mobile digital radio player, to view, select, sort, search for, and/or otherwise interact with the various content channels of the satellite radio service accessed using the mobile digital radio player, and/or to view, select, sort, search for, and/or otherwise interact with satellite radio content files stored on the mobile digital radio player, using tactile and/or oral commands. The operation of pushbuttons 114 for display control (not illustrated in FIG. 2) may display a menu screen or execute commands that allow the user to input, view, set, select, and/or change display profile settings or display settings such as color, resolution, size, language, tilt, or any other setting or variable by tactile or oral command. The operations of pushbuttons 114 for communications control (not illustrated in FIG. 2) may display a menu screen or execute commands that allow the user to input, view, select, reset, set, or activate communications settings or communications modes by tactile or oral command. According to various other exemplary embodiments, input from gesture sensors or presence sensors may be provided to vehicle control system to detect something other than touch. The gesture sensors or the presence sensors may be provided in place of tactile controls or in addition to tactile controls.

Pushbuttons 114 (and/or any other user interface element(s)) of vehicle control system 106 may be used to control other vehicle subsystems such as, but not limited to, vehicle door locking systems, vehicle cruise control systems, seat control systems, window control systems, vehicle lighting systems, vehicle radio system, wireless control systems (e.g., universal transmitter systems, remote control system, trainable transmitter systems, a HomeLink® system, etc.), media control systems, and/or any other control system that may accept user input.

Figure 3:
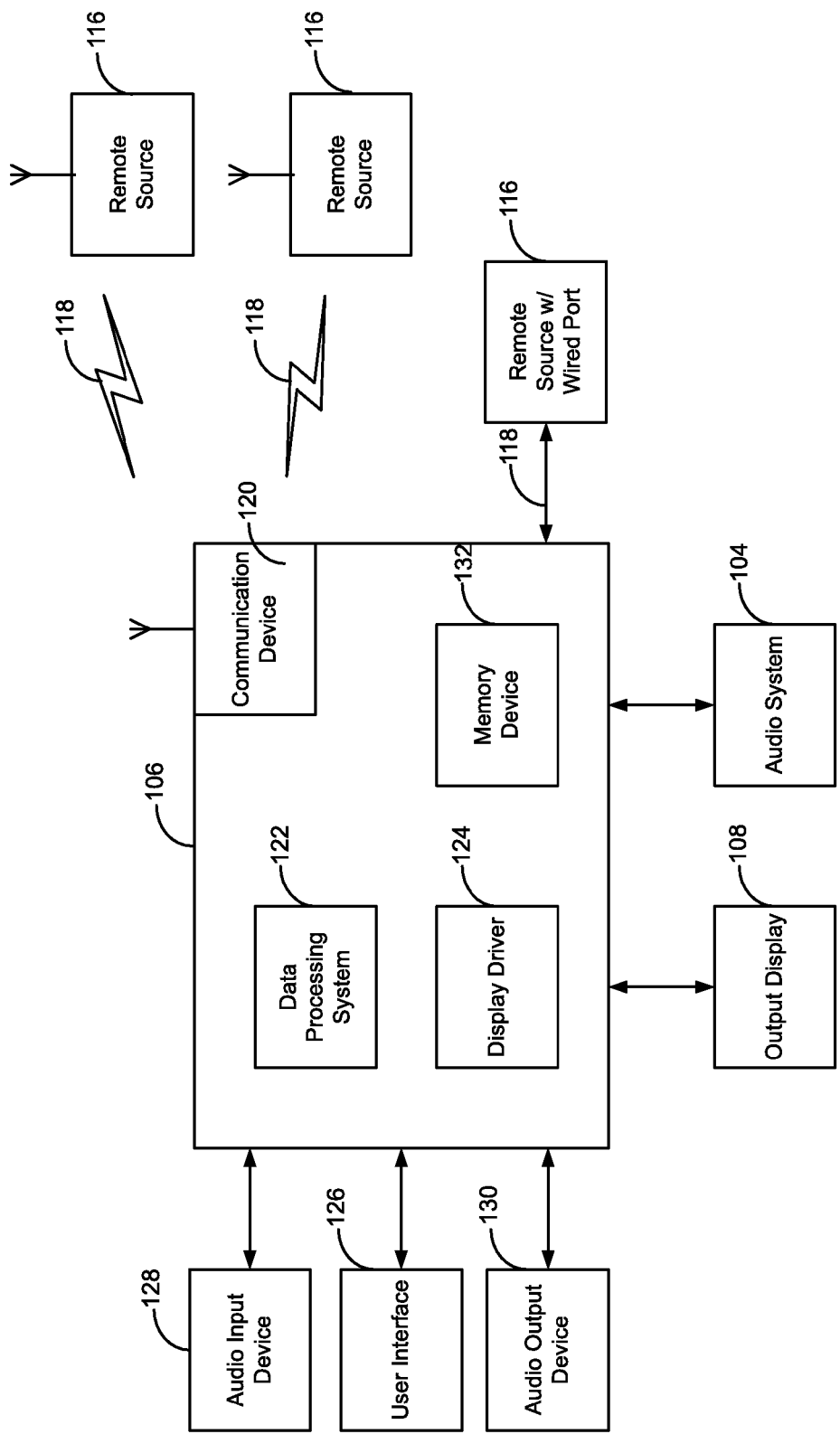
FIG. 3 is a block diagram of the vehicle control system of FIG. 1, according to an exemplary embodiment.

Referring to FIG. 3, vehicle control system 106 is capable of accessing data files from a remote source 116 over a communication link 118. For example, vehicle control system 106 may access media files, phonebook data files, calendar data, or any other accessible data for use by vehicle control system 106. Vehicle control system 106 may be capable of accessing data files from multiple remote sources over a single or multiple communication links. Vehicle control system 106 may also send and receive requests, signals, files, commands, messages (e.g., text messages, voice messages, etc.), meta information, stream data or information, and any other type of data to and/or from remote source 116 over communication link 118.

Vehicle control system 106 generally includes a communication device 120, a data processing system 122, a display driver 124, a user interface 126, an audio input device 128, an audio output device 130, an output display 108, and a memory device 132.

Communication device 120 is generally configured to establish communication link 118 with remote source 116. In one exemplary embodiment, vehicle control system 106 may establish a wireless communication link such as with Bluetooth communications protocol, an IEEE 802.11 protocol, an IEEE 802.15 protocol, an IEEE 802.16 protocol, a cellular signal, a shared wireless access protocol-cordless access (SWAP-CA) protocol, a wireless universal serial bus (USB) protocol, or any other suitable wireless technology. In another exemplary embodiment, vehicle control system 106 may establish a wired communication link such as with USB technology, IEEE 1394 technology (e.g., Firewire technology), optical technology, other serial or parallel port technology, or any other suitable wired link. According to various other exemplary embodiments, vehicle control system 106 and communication device 120 may form both wireless and wired connections with a plurality of remote sources. Communication links may be formed such that communication device 120 may be simultaneously connected to multiple remote sources. Communication device 120 may send and receive one or more data streams, data strings, data files and/or other types of data (e.g., non-file based data) from remote source 116. In various exemplary embodiments, the data files may include text, numeric data, audio, video, program data, command data, information data, coordinate data, image data, streaming media, or any combination thereof.

Data processing system 122 is coupled to communications device 120 and is generally configured to control each function of vehicle control 106. Data processing system 122 may facilitate speech recognition capabilities of vehicle control system 106 for the convenience of the user. Data processing system 122 may include digital or analog processing components and/or be of any past, present, or future design that facilitates control or provides processing features to vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate, control, and/or facilitate the various devices, components and features of the vehicle control system (e.g., communications device 120, output display 108, display driver 124, memory device 132, audio system 104, user interface 126, audio input device 128, audio output device 130, etc).

Display driver 124 is coupled to output display 108 and is typically configured to provide an electronic signal to output display 108. In one exemplary embodiment, the electronic signal may include the text and/or numeric data of the data files, while in other exemplary embodiments, any other desired data may be included with the text and/or numeric data or by itself in the electronic signal to output display 108. In another exemplary embodiment, display driver 124 may be configured to control output display 108 with touch-screen capabilities, while in other exemplary embodiments, display driver 124 may be configured to control output display 108 without making use of touch-screen capabilities. Display driver 124 may include any number of functions, software or hardware, to facilitate the control and display of images on output display 108. In still other exemplary embodiments, display driver 124 may be of any past, present, or future design that allows for the control of output display 108.

User interface 126 is typically configured to facilitate tactile user interaction with vehicle control system 106. In various exemplary embodiments, user interface 126 may include pushbuttons or rotatable knobs as in the exemplary embodiment of FIG. 2 in any similar or dissimilar configuration or may include other tactile user contact points.

Audio input device 128, for example a microphone, is configured to receive the utterance of a user for transmission to data processing system 122 for speech recognition so that the functions of vehicle control system 106 may be operated by voice command. Audio output device 130, for example a built-in speaker, is configured to provide the user with an audio prompt of various functions, such as user selection confirmation.

Memory device 132 is configured to store data accessed by vehicle control system 106. For example, memory device 132 may store data input by remote source 116, data created by data processing system 122 that may be used later, intermediate data of use in current calculation or process, or any other data of use by vehicle control system 106.

Figure 4:
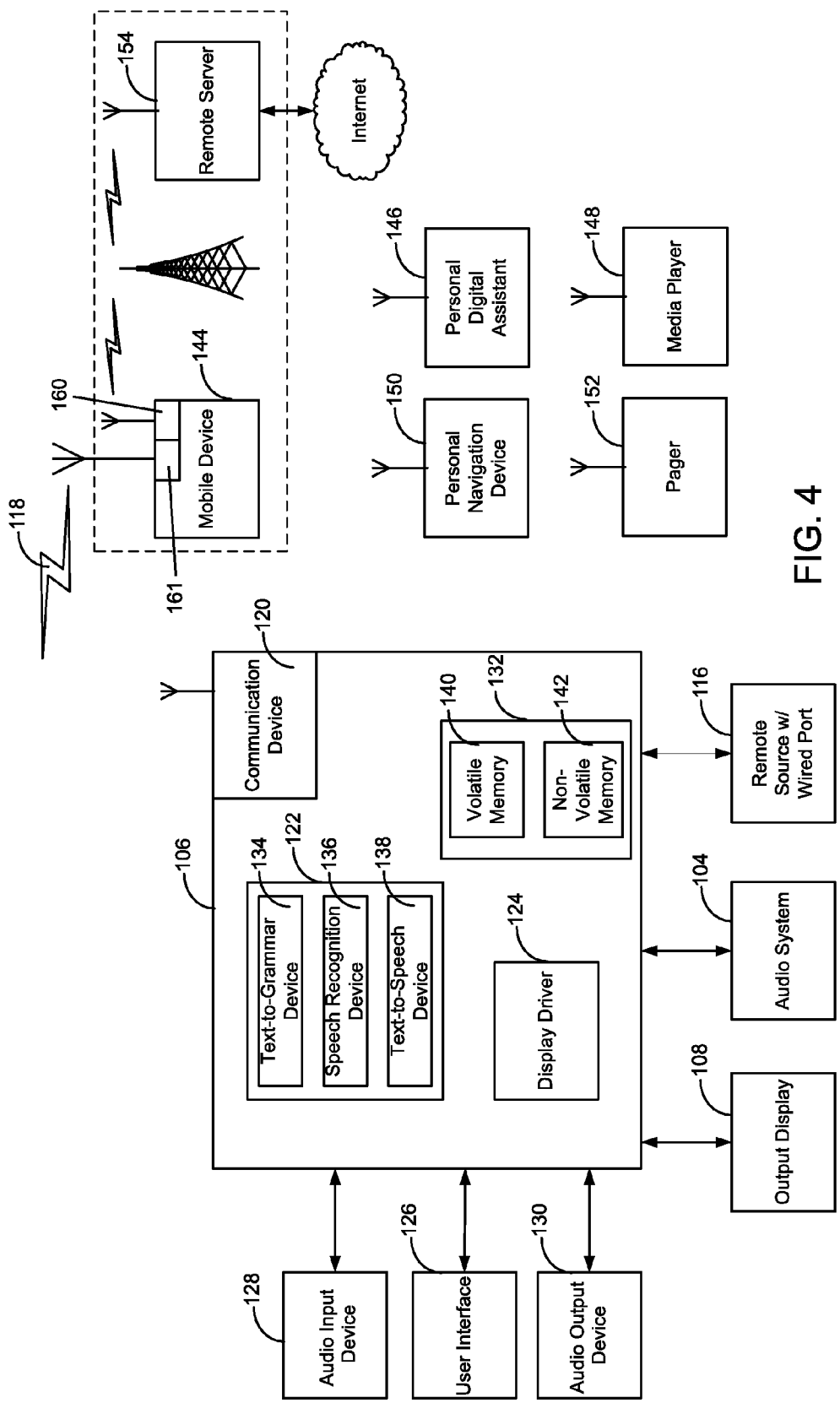
FIG. 4 is a more detailed embodiment and block diagram of the vehicle control system of FIG. 3, according to one exemplary embodiment.

Referring to FIG. 4, vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 is preferably coupled to communication device 120 and is generally configured to generate a phonemic representation of the text and/or numeric data of each of the data files received by communication device 120 from remote source 116. The phonetic representation of the text and/or numeric data of each data file may be configured to facilitate speech recognition of each data file. After conversion of a data file to a phonemic representation, the data file may be accessed via an oral input command received by speech recognition device 136 via audio input device 128. According to an exemplary embodiment, text-to-grammar device 134 may be able to provide phonemic representations of information received from a remote source.

Speech recognition device 136 is typically configured to receive an oral input command from a user via audio input device 128. Speech recognition device 136 compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to remote device 116 to facilitate interactive control of a remote source via a communication link.

Text-to-speech device 138 is generally configured to convert the text and/or numeric data of each data file received from remote source 116 into an audible speech representation. This functionality may allow vehicle control system 106 to audibly give data to the user via audio output device 130 or the audio system 104. For example, vehicle control system 106 may repeat a user selected function back to the user, provide navigational information, announce directions, announce menu options, announce media file information, provide phonebook or contact information, or other information related to data stored in memory 132, remote source 116, remote server 154, etc. According to an exemplary embodiment, text-to-speech device 138 may be able to provide an audible speech representation of information received from a remote source.

According to various other exemplary embodiments, text-to-grammar functionality, speech recognition functionality, and text-to-speech functionality are implemented primarily in software and data processing system 122, which is a general purpose data processing system. According to yet other exemplary embodiments, text-to-grammar functionality, speech recognition functionality, and text-to-speech functionality are implemented partially in software and partially in hardware.

Memory device 132 includes both a volatile memory 140 and a non-volatile memory 142. Volatile memory 140 may be configured so that the contents stored therein may be erased during each power cycle of the vehicle control system 106 or the vehicle 100. Non-volatile memory 142 may be configured so that the contents stored therein may be retained across power cycles, such that upon vehicle control system 106 and/or vehicle 100 power-up, data from previous system use remains available for the user. According to an exemplary embodiment non-volatile memory 142 may store one or more user profiles, display profiles, communications profiles, navigation profiles, or any other type of user or system setting file.

According to an exemplary embodiment, remote source 116 may be any suitable remote source that includes a transceiver and is able to interface with vehicle control system 106 over communication link 118, in either a wireless or wired embodiment. In various exemplary embodiments, remote source 116 may be one or more of a mobile phone 144, a personal digital assistant (PDA) 146, a media player 148, a personal navigation device (PND) 150, a pager 152, a remote server 154 that may be coupled to the Internet, or various other remote data sources. Remote source 116 may have a storage device, one or more processing devices, and one or more communications devices. According to an exemplary embodiment, remote source 116 is a global positioning system capable remote source. According to various exemplary embodiments, remote source 116 may connect to the Internet or any other remote source with first communication device 160 while communicating with vehicle control system 106 using second communication device 161.

Figure 5:
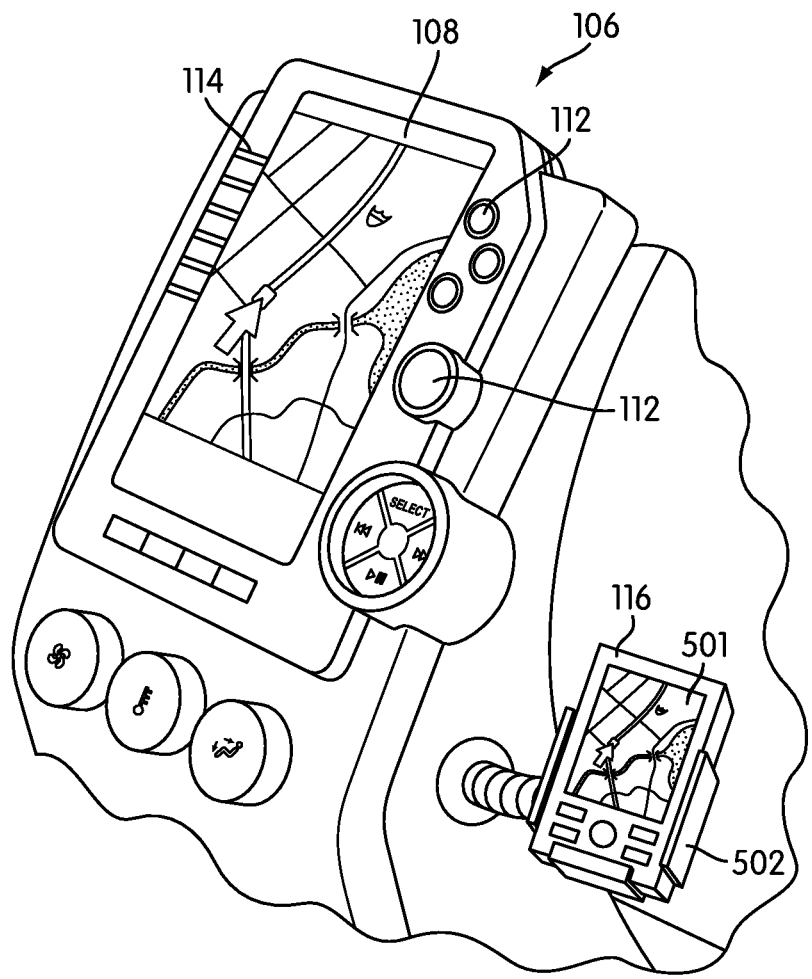
FIG. 5 is a perspective view of a vehicle control system and a remote source, according to one exemplary embodiment.

Referring to FIG. 5, according to an exemplary embodiment, vehicle control system 106 is shown replicating the display of remote source 116 on output display 108. Remote source 116 is shown as a PDA or PND resting in supporting arm 502. Remote source 116 may be a location-sensing capable remote source (e.g., a remote source having a GPS receiver) configured to access navigational data and to use this navigational data to at least partially generate an image that may be shown on remote display 501. The vehicle control system 106 may establish a communications link with remote source 116, initiate a image replication mode, receive images from remote source 116, and display the received images on output display 108. According to various exemplary embodiments, remote source 116 is a remote source capable of generating (e.g., partially generating, completely generating or otherwise generating, etc.) graphics for output to its own display and communicating a images of the image displayed (e.g., recently displayed, currently displayed, or in the future displayed, etc.) on its own display to control system 106. Providing an image from a remote source to a vehicle control system 106 may be one example of a remote source providing a feature or enhancement to a vehicle control system 106. According to an exemplary embodiment, communications device 120 may allow multiple remote sources to be connected to control system 106 simultaneously. When multiple remote sources are connected to control system 106, more than one remote source may be used to provide a feature or features to control system 106. For example, a PND may include a GPS device and may generate a map image based on its navigational data. This image may be transmitted to the control system for display and regularly updated as the vehicle moves. The vehicle control system may also communicate audio turn-by-turn directions to a user over a vehicle audio system by connecting to a remote source such as a PND and receiving turn-by-turn directions from the PND via the connected wired or wireless communications device. A mobile phone capable of conducting data communications may be simultaneously connected to the control system. The mobile phone may use its data features to download additional information about the image generated by the PND. This information may then be transmitted to the control system for overlay or other output on the control system. For example, the mobile phone may download locations of nearby hotels or restaurants, transmit these locations to the control system, and the control system may use both the image received from the PND and the coordinates received from the mobile phone to provide an enhanced navigational feature to output display 108.

According to an exemplary embodiment, remote source 116 may have any number of processes, software and/or hardware, to generate data for transmittal to control system 106. For example, remote source 116 may include a software program that extracts an image (e.g., screenshot, a bitmap screen dump, screen capture, etc.) of the information presently or recently displayed on the remote display 501. This software may operate in any number of ways including reading hardware devices of the remote source to extract the information (e.g., a memory device, display buffer, display driver buffer, display hardware, etc.) and/or using other software to extract the information (e.g., display driver software, operating system software, etc.).

According to an exemplary embodiment, remote source 116 may also have communications software configured to facilitate the transfer of data, information, or images from remote source 116 to vehicle control system 106. Communications software configured to facilitate the transfer of data may be integrated with the data generating software or may be relatively separate communications software. This software may include any number of variables that may determine the operation of the data generation and transfer functions. For example, software loaded on remote source 116 may include software with refresh rate variables (e.g., how often to generate data, how often to send data, etc.), capture variables (e.g., how much of the screen to capture, what resolution to capture at, how often to capture a screen, etc.), and transfer variables (e.g., how often to transfer, how often to attempt to transfer, what meta information to include with the transfer, whether to compress the image before transfer, etc.). These variables may be changed or edited with a user interface provided by remote source 116 or with a user interface provided by vehicle control system 106. For example, a user inside the vehicle may edit relevant communications and display variables with input devices 112, 114, a touch screen display 108, and/or with voice recognition. Relevant variable information may be stored within a memory device on remote source 116, within vehicle control system 106, or both. Variable information may be stored within either remote source 116 or vehicle control system 106 as profile information (e.g., within a display profile, a communications profile, etc.). This profile information may be stored in non-volatile memory (e.g., non-volatile memory 142, flash memory, etc.) and may be recalled by vehicle control system 106 when needed.

FIG. 5 further illustrates a supporting arm 502 according to an exemplary embodiment. Supporting arm 502 is illustrated as supporting remote source 116 via a flexible arm and a cradle apparatus. Supporting arm 502 and accompanying cradle may be a passive supporting arm and cradle (e.g., having only a holding or supporting function, etc.) while remote source 116 communicates via a wireless protocol or may be an active cradle or docking station (i.e., facilitating a wired and/or charging connection between the remote source 116 and the control system 106, etc.). According to various other exemplary embodiments, supporting arm 502 is not included or used with the system and remote source 116 may be physically located anywhere interior or exterior of vehicle 100. For example, remote source 116 may exist within the driver's pocket, in the driver's suitcase, on the seat, at a location exterior the vehicle, etc.

Figure 6:
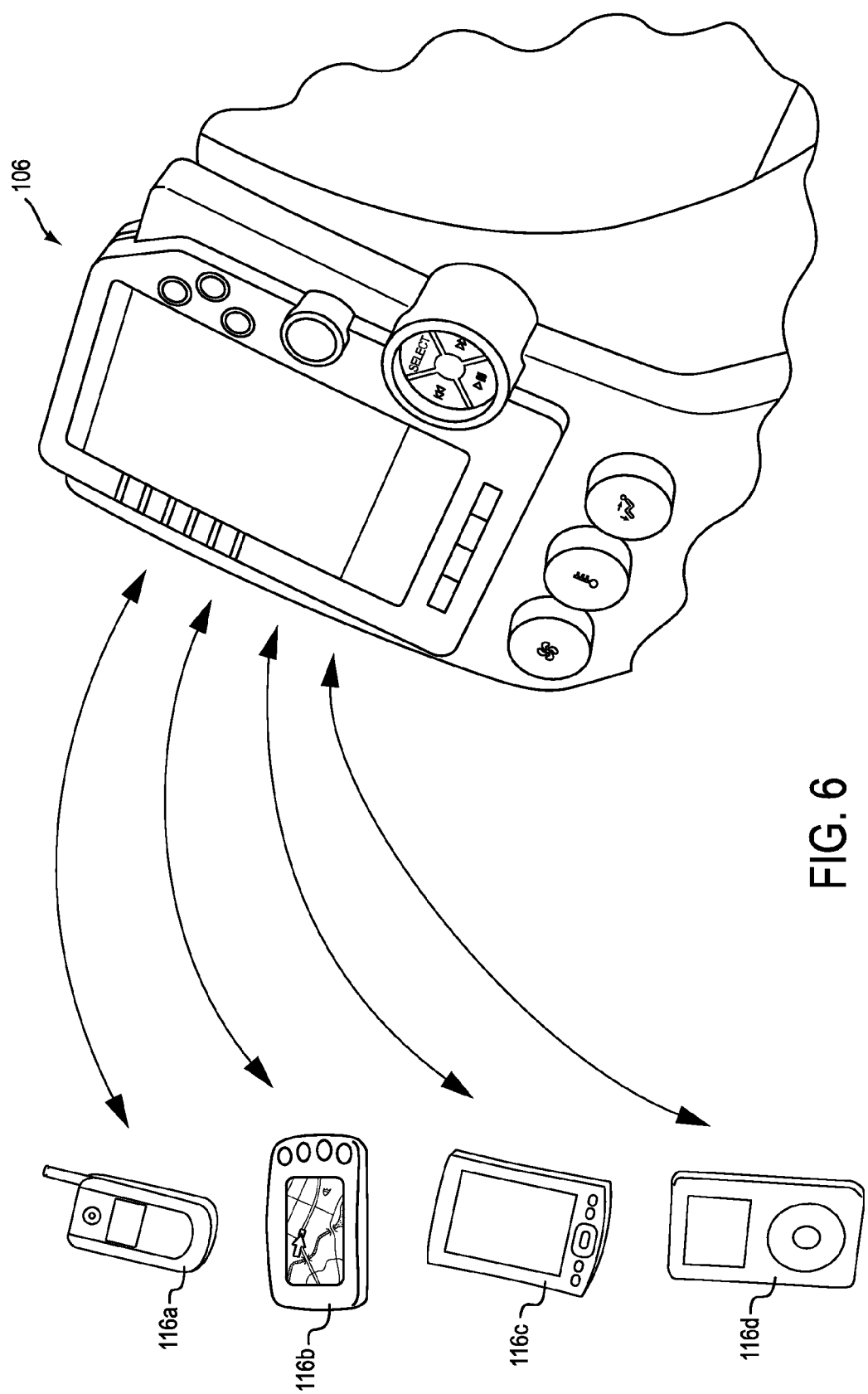
FIG. 6 is block diagram of a vehicle control system communicating with a plurality of remote sources, according to an exemplary embodiment.

Referring to FIG. 6, according to an exemplary embodiment, control system 106 is shown having data connections with a variety of remote sources. For example, control system 106 may establish a data connection with cellular telephone 116a, a PND 116b, a PDA 116c, a media player 116d, etc. Control system 106 may be configured to establish simultaneous data connections with a plurality of remote sources 116 using communications device 120. For example, control system 106 may establish a simultaneous data connection with mobile telephone 116a and media player 116d. According to various exemplary embodiments, control system 106 may establish simultaneous data connections with any combination and/or number of remote sources. Control system 106 may use data processing system 122 and/or a communications device 120 to control the communications between the vehicle control system and a plurality of remote sources. The connected remote sources may transmit data directly to or from the vehicle control system. The vehicle control system may also be used as a network gateway or router and may be configured to route information from one remote source to other remote sources connected to the vehicle control system. Vehicle control system 106 may include any number of hardware and/or software components to implement multiple device connectivity. For example, vehicle control system 106 may have more than one wireless communications device, more than one wired communications device, and/or any number of software drivers, software profiles, and software applications configured to facilitate and control multiple device connectivity.

Figure 7:
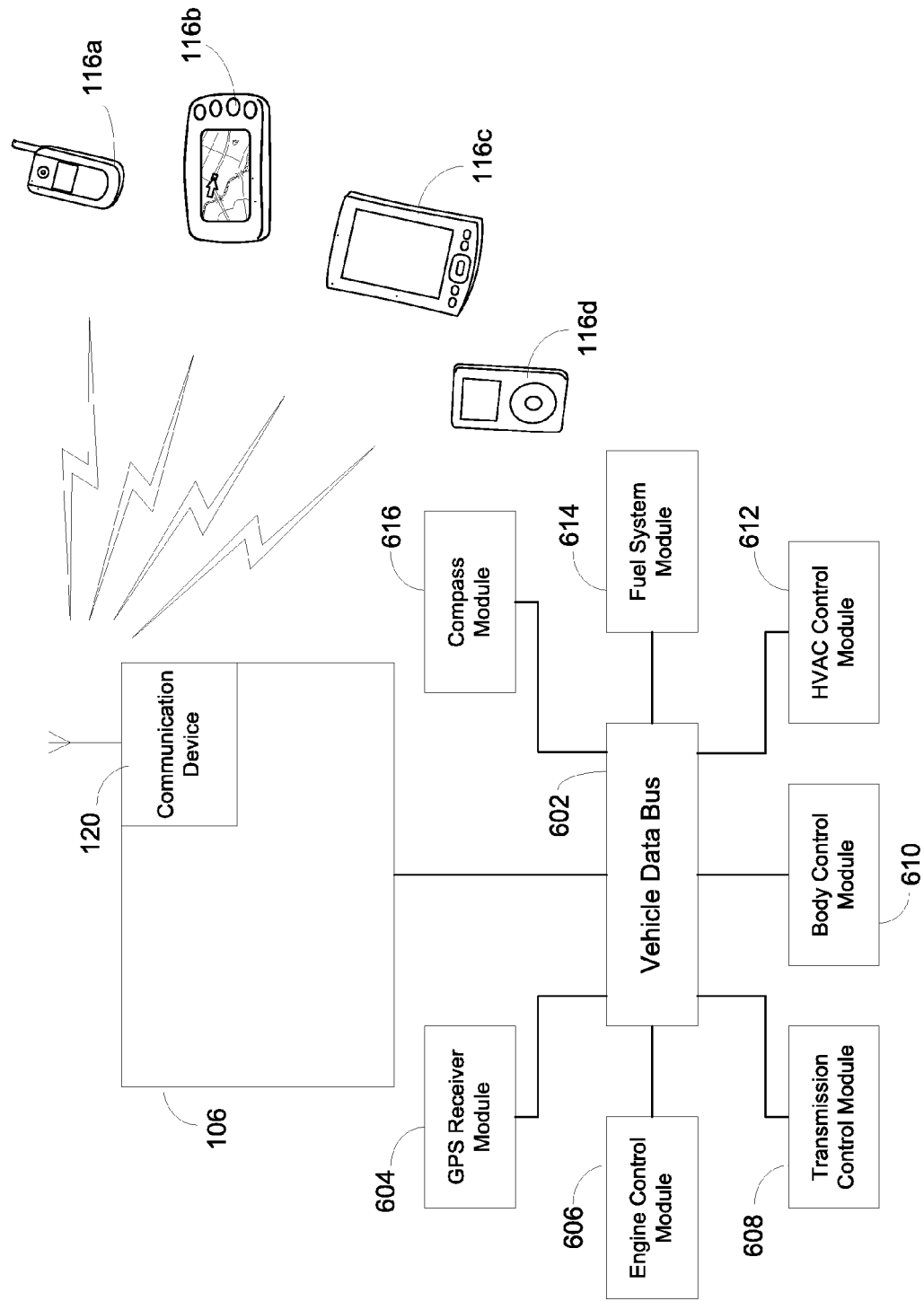
FIG. 7 is a block diagram of a vehicle control system communicating with a plurality of remote sources and having an interface module connected to a vehicle data bus and a plurality of vehicle hardware modules, according to an exemplary embodiment.

Referring to FIG. 7, according to an exemplary embodiment, control system 106 is shown having a connection with a vehicle data bus 602. The connection with vehicle data bus 602 may be via an interface module of the control system. The vehicle data bus may be connected to a number of vehicle modules. These modules may include a GPS receiver module 604, an engine control module 606, a transmission control module 608, a body control module 610, a HVAC control module 612, a fuel system module 614, a compass module 616, a timing control module, an anti-lock braking module, etc. Vehicle data bus 602 may be any electronic communications network that interconnects vehicle components. The vehicle modules connected to the vehicle data bus may typically receive input from sensors (e.g., speed sensors, temperature sensors, pressure sensors, etc.) that the vehicle module may use in calculation. Vehicle modules may also use actuators to conduct actions commanded by the modules (e.g., turn on a cooling fan, change a gear, unlock a door, etc.). The modules may be configured to exchange data between themselves via the vehicle data bus 602. The control system 106 or processing system 122 may be configured to route information to or from vehicle modules on the vehicle data bus to or from other components of the control system or to or from remote sources. According to various embodiments, vehicle bus 602 may be a vehicle bus of any type or technology. For example, vehicle bus 602 may be a local interconnect network, a controller area network, a FlexRay bus, a Media Oriented System Transport (MOST), a Keyword Protocol 2000 bus, a serial bus, a parallel bus, a Vehicle Area Network, a DC-BUS, a IDB-1394 bus, a SMARTwireX bus, a CAN (e.g., BCAN) bus, an IE bus (e.g., a GA-NET bus), etc. According to various exemplary embodiments, vehicle data bus 602 may be of any past, present or future design capable of providing an electronic communications network that interconnects vehicle hardware components inside a vehicle. Vehicle control system 106 may include any number of hardware interfaces, transceivers, bus controllers, hardware controllers, and/or software controllers configured to control communication activities of the vehicle data buses of the vehicle.

Referring further to FIG. 7, according to an exemplary embodiment, control system 106 may access data of vehicle data bus 602, and further of vehicle hardware modules 604-616, to provide features to control system 106 and/or to remote sources 116a-d. For example, control system 106 may read compass information from compass module 616 via vehicle data bus 602. Control system 106 may display this information on any of its embedded displays, but may also transfer this information to a remote source for further transmission, display, or processing. For example, remote source 116b (a PND) may use the information retrieved from the compass module to more accurately generate navigational images for transmission to the vehicle output display. According to another exemplary embodiment, fuel system module 614 may send a low fuel warning or information to control system 106. Control system 106 may then use a WiFi-enabled PDA 116c or data communications-enabled a cellular phone 116a to download information regarding nearby gas stations. This information may be forwarded to control system 106 for processing and display or routed through control system 106 to remote source 116b for processing on the PND. It is important to note than any number of enhanced data or control features may be added to control system 106 and/or to connected remote sources 116a-d when control system 106 is capable of serving as a network gateway simultaneously connected to a plurality of remote sources and vehicle hardware modules of a vehicle data bus.

Figure 8:
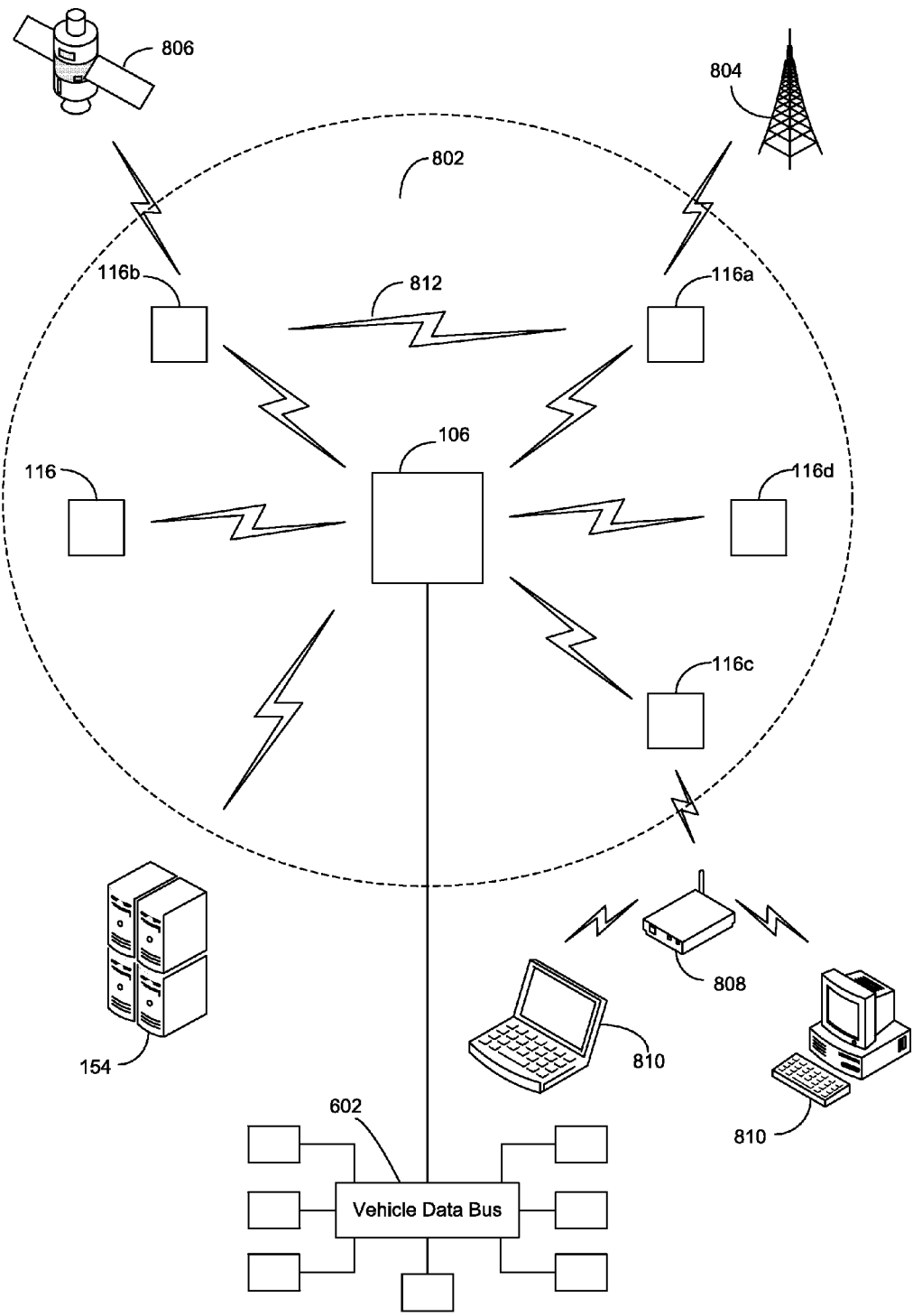
FIG. 8 is a block diagram illustrating a vehicle control system facilitating a plurality of simultaneous communications links with a plurality of remote sources, according to an exemplary embodiment.

Referring to FIG. 8, according to an exemplary embodiment, a control system 106 having a communications device 120 capable of serving as a communication gateway is illustrated. Control system 106 may be simultaneously connected with devices on the vehicle data bus, a plurality of remote sources 116, a remote server 154, and/or any number of other vehicle systems or remote sources. Communications device 120 may be a communications device capable of serving as a wired and/or wireless network gateway. Communications device 120 may be a communications device capable of creating a piconet. Multiple devices and/or remote sources may be capable of forming communications links with communications device 120. Communications device 120 may serve as a master node in a one-to-many data network, with any number of remote sources acting as slaves. According to one exemplary embodiments, communications device 120 is a Bluetooth communications device capable of serving as a master device or a slave device on a Bluetooth® piconet or scatternet. Processing system 122 and communications device 120 may be configured to establish communications links, control data activities, and conduct user interface functions necessary to provide network gateway features to vehicle control system 106. According to various other exemplary embodiments, communications device 120 may be a communications device (or group of communications devices) of any type or design of the past, present or future capable of establishing multiple wireless data connections and serving as a network gateway. Communications device 120 may work in conjunction with data processing systems of the control system to accomplish various communications and data tasks. For example, a vehicle control system 106 having multiple wired and wireless communications devices may use a data processing system 122, a software operating system, and a variety of communications software to coordinate many of the communications tasks of the vehicle control system and to enable the control system to function as a mobile device gateway.

Referring further to FIG. 8, according to an exemplary embodiment, control system 106 has a first wireless data communications range 802. This first wireless data communications range may be based on a first wireless protocol or technology. Control system 106 may have a second wireless data communications range that enables it to connect with remote sources outside of its first wireless data communications range. For example, control system 106 may include a second wireless protocol or technology that allows it to communicate with a remote server 154 located beyond the first wireless data communications range 802. While control system 106 is shown communicating with remote sources 116 in a star or one-to-many network topology, any network topology may be used. For example, control system 106 and its communications device 120 may serve as a node (or coordinator or controller) of a meshed network of a network made up of multiple nodes. It is important to note that each remote source 116 may also have multiple communications methods, devices, and/or protocols. For example, remote source 116a may be a mobile phone capable of maintaining simultaneous data connections with control system 106 and a cellular antenna 804. Similarly, PND 116b may be a GPS device capable of maintaining simultaneous data connections with control system 106 and a satellite 806. Remote source 116c, a PDA, for example, may be capable of maintaining simultaneous data connections with control system 106 and a WiFi router 808. When used in this manner, remote source 116c may access or communicate with devices on an external network (e.g., computers 810 of the WiFi network formed by wireless router 808, etc.). Vehicle control system 106 may be able to coordinate or recognize these multiple communications and use them for increased functionality. Remote sources 116 may also be configured to communicate between themselves. For example, remote sources 116b and 116a may be capable of communicating between themselves while maintaining a connection with control system 106. This connection is shown as communications link 812.

Referring further to FIG. 8, control system 106 may serve as a wireless (or wired) access point or router for all remote sources connected to the control system. For example, remote source 116c (e.g., a PDA) may be able to send information to computers 810 from remote source 116d (e.g., a portable media player) using control system 106 to route data from remote source 116d to 116c to computers 810. Control system 106 may be able to route information from the vehicle modules connected to the vehicle data bus to remote sources and/or eventually to the network of router 808 and computers 810. According to various exemplary embodiments, control system 106 may route information to and from any vehicle module, system device, or remote device to which it is connected. Control system 106, including data processing system 122 and communications device 120, may be configured to conduct all network tasks necessary to facilitate the described data communications tasks. For example, control system 106 may control communications device 120 to pair remote sources 116 to vehicle control system 106. Control system 106 may provide a user interface prompting the user through a pairing process. Once devices are paired and connected, communications device 120 may conduct any number of digital and/or analog communications tasks necessary to conduct desired data or voice communications. For example, communications device 120 (with or without help from data processing system 122) may conduct any number of encryption tasks, modulation tasks, spread spectrum tasks, prioritizing tasks, frequency hopping tasks, etc.

Text Messaging

Figure 9:
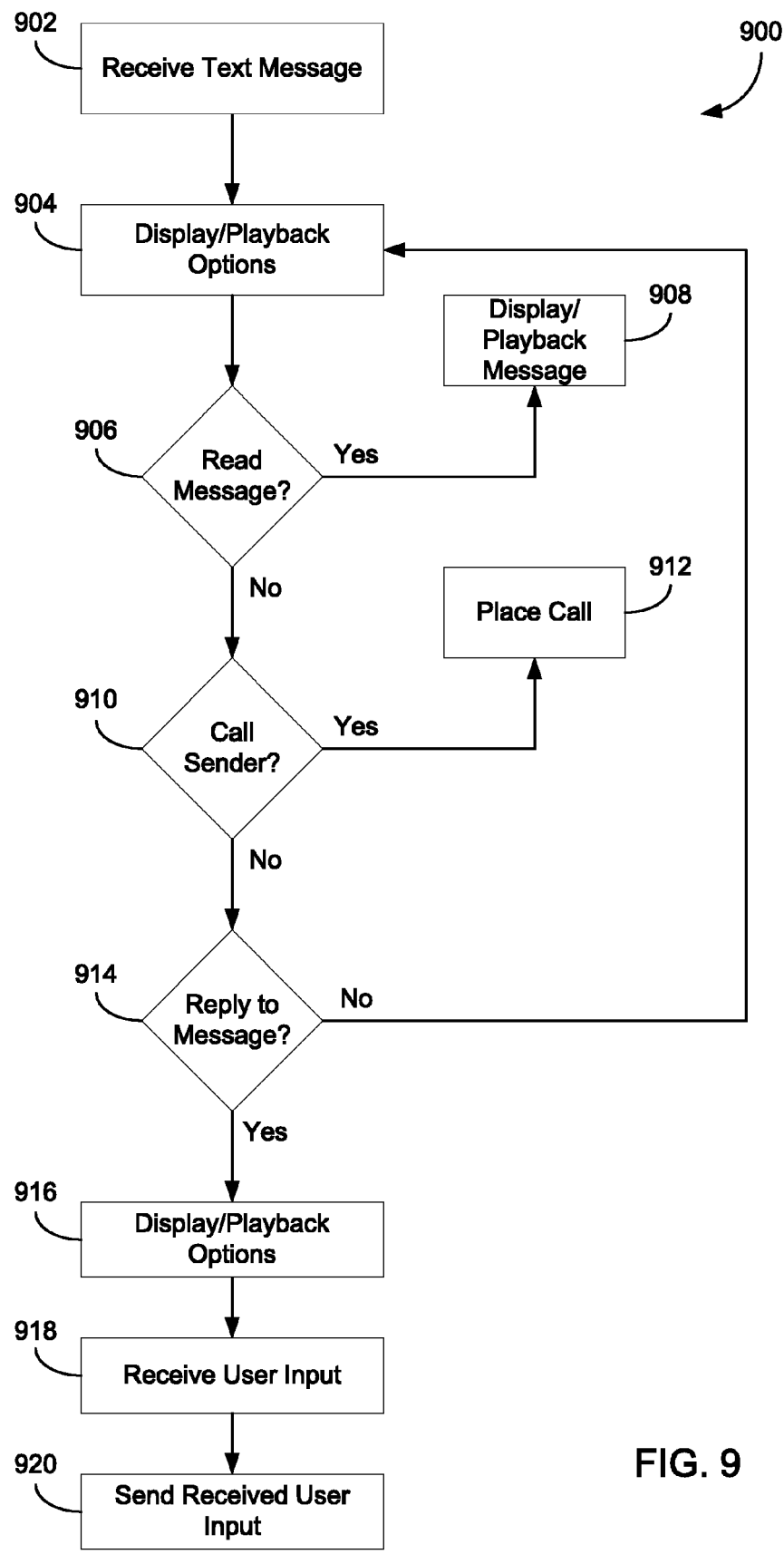
FIG. 9 is a flow diagram of a method of responding to a received text message, according to an exemplary embodiment.

Referring to FIG. 9, a flow diagram of a method 900 of responding to a received text message is shown, according to an exemplary embodiment. A text message may be received by a device (e.g., PDA, cell phone, etc.) coupled to or connected to a vehicle control system (step 902), for example, vehicle control system 106. The vehicle control system may display and/or playback options (e.g., using the display system and/or audio output system) relating to responding to the text message (step 904). The options may include, but are not limited to, reading the message (e.g., displaying and/or playing back the message for a user of the vehicle), calling the sender of the message, ignoring the message, transferring the message to another device, forwarding the message to another phone number, forwarding the message to an e-mail address, and replying to the message (e.g., via an audible or tactile input).

If the user selects to read the message (step 906), the message may be displayed on a display system (e.g., display system 108) and/or played back on an audio system (e.g., audio system 104) for the user (step 908). The audio system may use the text-to-speech device 138 of FIG. 4 to configure the text message into an audible speech representation for the audio system. If the user selects to call the sender of the message (step 910), the device may call the sender of the message (step 912). The vehicle control system may use the hands-free phone operation described in FIG. 2 to assist the device and user in calling the sender of the message. If the user selects to reply to the message (step 914), options for the reply message may be displayed or played back on the vehicle control system (step 916) and the user may choose an option and the option may be received by the vehicle control system (step 918). For example, a list of options may be displayed or played back on the vehicle control system, such as "Yes", "No", "I am driving", etc. The user may select a predefined option to send as a reply to the text message. Alternatively, the user may provide the vehicle control system with an audible response via an audio input device, and the vehicle control system may use a speech recognition device to convert the input into a text message to send as a reply to the text message. The reply may then be sent to the sender of the original text message using the hands-free phone operation of FIG. 2 or other method (step 920).

Embedded Phone Module/Connected Phone Activity

Referring to FIG. 10A, a block diagram of control system 106 coupled to a vehicle module 1002 (e.g., body control module 610) is shown, according to an exemplary embodiment. Vehicle module 1002 may be comprised of various vehicle modules and systems relating to the functionality of the vehicle. For example, a lighting system, door lock system, window system, security system module, HVAC system, and/or other systems may be included within vehicle module 1002.

Control system 106 may include an embedded phone module 1000. Embedded phone module 1000 may be configured to accept data from a cellular phone, PDA, or other remote device that may connect to control system 106. Control system 106 may connect to vehicle module 1002 via vehicle data link or bus 602, providing vehicle module 1002 with data received from embedded phone module 1000. The data may include commands or requests regarding various vehicle systems of vehicle module 1002. For example, commands may include a request to lock or unlock the doors of the vehicle, to lower or raise the windows of the vehicle, to turn on or off the interior lights of the vehicle, to turn on the heat, air conditioning, or other HVAC feature of the vehicle, etc.

It is important to note that embedded phone module 1000 may be configured to handle a variety of call types and/or communication types. For example, embedded phone module 1000 may be configured to place a voice call, send text messages (e.g., SMS messages), operate as a modem using a voice call, send and/or receive control channel data, and conduct data calls (e.g., 1×RTT data calls). Furthermore, it is important to note that any of the activities, call types, or communication types of the embedded phone may be originated via logic of the vehicle control system and/or in response to signals received from a remote source at the vehicle control system. Similarly, the activities, call types, or communication types of the embedded phone may be terminated via logic of the vehicle control system and/or in response to signals received from a remote source at the vehicle control system. It is also important to note that the activities, call types, or communication types of the embedded phone may be managed by one or more software applications of control system 106 or by a connected mobile network.

Referring to FIG. 10B, a flow diagram of a method 1030 of communications between a remote device (e.g., cell phone, PDA, etc.) and a control system (e.g., the control system shown in FIG. 10A) is shown, according to an exemplary embodiment. A control system (e.g., control system 106) of the vehicle may receive a communication request from the remote device (step 1032), for example a telephone call from a mobile phone. The device may be connected and data may be received by the control system via the connection or call (step 1034). The received data is interpreted (step 1036), for example converted from an audible command to a textual representation of the command.

Based on the interpreted data, a signal may be sent to a vehicle module (step 1038). For example, if a user wishes to lock the doors of the vehicle, a signal to lock the doors may be provided by the control system to the body control module. Once the command indicated by the signal has been executed by the vehicle module, a confirmation may be received by the control system from the vehicle module (step 1040). The confirmation is then sent to the connected device for use by the user (step 1042).

Referring to FIG. 10C, a flow diagram of a method 1060 of communications between a remote device (e.g., cell phone, PDA, etc.) and a control system (e.g., the control system shown in FIG. 10A) is shown, according to another exemplary embodiment. A vehicle module (e.g., door lock, engine, cluster display, etc.) may send information to the vehicle data bus, and the control system may receive the information from the vehicle data bus (step 1062). The information received may then be interpreted (step 1064), for example to define a signal that may be sent to a remote device or other module for viewing by a user of the vehicle. It is important to note that the information need not be received at the control system from the vehicle data bus, but could be information generated by the control system, information relating to a device connected to the control system, information from a body module directly connected to the control system, or any other information.

A communications link (e.g., via a phone call) may be established between the control system and a remote source (step 1066). According to an exemplary embodiment, the communications link is formed using a phone module communicably or fixably coupled to the control system (e.g., an embedded phone module). Once the link is established, a signal representing the information may be provided to the remote source (step 1068). The signal may correspond to a state of a system of the vehicle module (e.g., if the doors are locked, if an alarm was activated, etc.).

According to an exemplary embodiment, the remote source contacted in method 1060 is a service organization or service provider. After receiving the information from the vehicle control system, the service provider may further interpret the information and/or forward the information (or a message based on the information) to another device or source (e.g., a user e-mail address, a pager, a cell phone number, a device configured to receive text messages, etc.). For example, the vehicle control system may include logic that determines that a crash has occurred. Once this determination is made, the vehicle control system may use an embedded phone module to call a service provider. The service provider may inform emergency resources (e.g., an ambulance, the police) and also send an alert to a family member's cell phone.

Software/Firmware Updates

From time to time, modules of the vehicle, the vehicle control system, and/or a connected device may require software/firmware updates to enable additional features, to fix errors, and/or to improve performance. According to an exemplary embodiment, the vehicle control system may be configured to update based on information received from a connected device. According to yet other exemplary embodiments, the vehicle control system may provide updates from a first connected device to another connected device. For example, a mobile phone connected to the control system via a USB connection may be able to provide an update for a HomeLink® device connected to the vehicle control system. The vehicle control system may be configured to receive one or more update files from a connected device, network (e.g., the Internet, mobile phone network, etc.), or other connected remote source. Once received, the vehicle control system may process the update file to conduct the update and/or forward the update file to another connected device. The updating activity may update control system or device firmware, operating system components, software applications, device drivers, and/or any other module, function, software, executable in non-volatile memory, configuration file, or component that may be updated via software. The update process may include any number of authenticating, decompressing, and/or decrypting steps to attempt to ensure the update is secure and/or expected.

Figure 11:
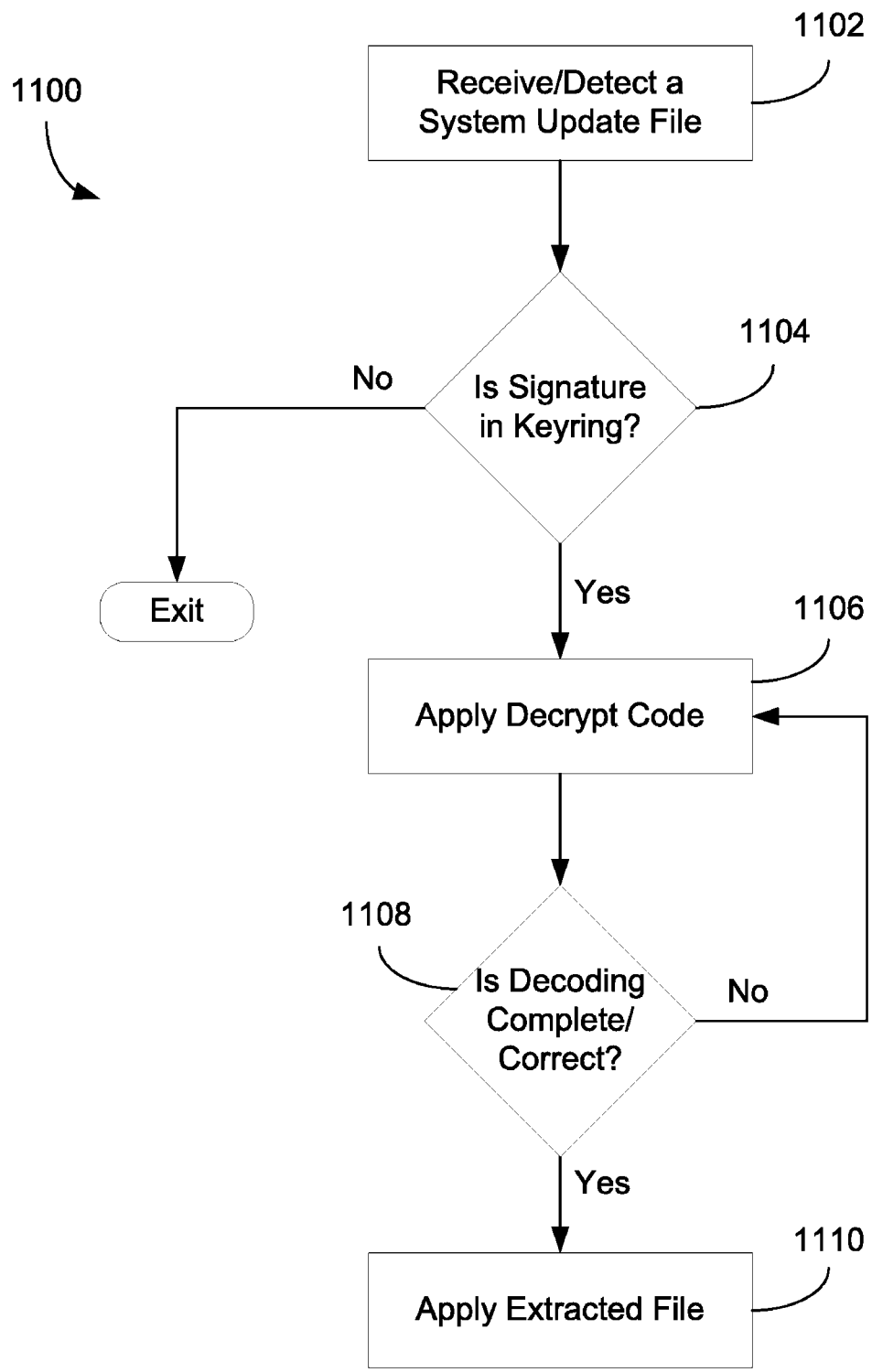
FIG. 11 is a flow diagram of a method of decoding a file, such as a text message, according to an exemplary embodiment.

Referring to FIG. 11, a flow diagram of a method 1100 of decoding a system update file, for example via a wired or wireless USB connection, is shown according to an exemplary embodiment. The file is first received by a system responsible for encoding and decoding files (step 1102), such as control system 106. Method 1100 may then determine if the signature of the file is available in a keyring (step 1104). The keyring generally contains decryption codes for known signers and signatures for files. The codes may be used to determine file properties such as module model and serial number, vehicle vendor, model, or VIN, etc. According to an alternative exemplary embodiment, any other technique of determine if a file may be decrypted or not may be used. If the keyring does not have a decryption code for the file, method 1100 may terminate. Otherwise the message may be decrypted using the appropriate decryption code (step 1106).

If the decoding of the file is complete and/or correct (step 1108), then the resulting extracted file may be applied to the appropriate vehicle function (step 1110). The encoded or encrypted file may contain an executable command, configuration files, scripts, etc., that may be applied once decoded. For example, the file may be an update file containing information regarding user preference, and the preferences stored within the memory of the vehicle control system may be updated with the update file once extracted. If the decoding is not complete or correct, a decrypt code may be applied again in an attempt to decode the file (step 1106).

Internet/Streaming Media

Figure 12:
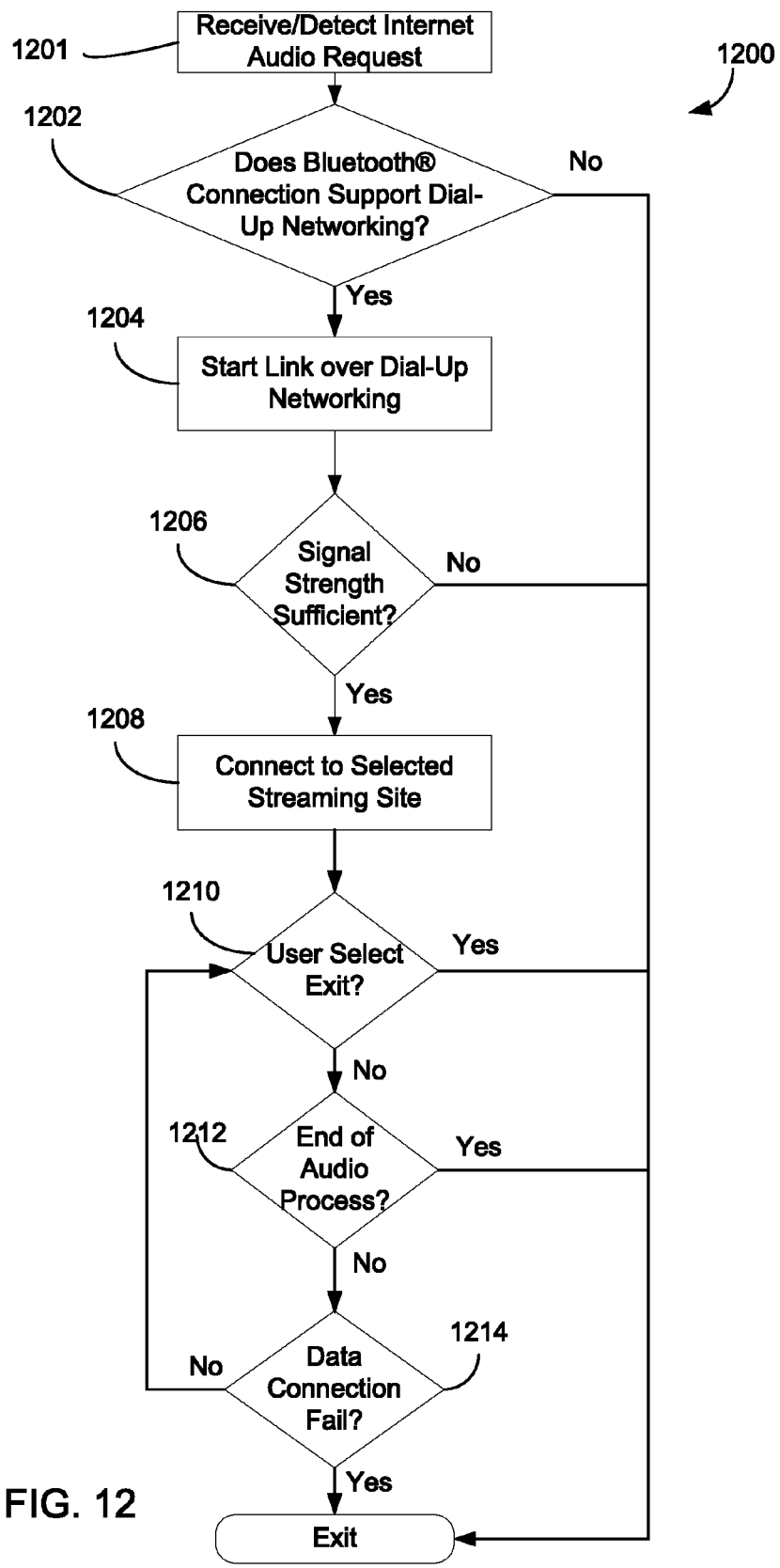
FIG. 12 is a flow diagram of a method of running an Internet audio application, according to an exemplary embodiment.

Referring to FIG. 12, a flow diagram of a method 1200 of running an Internet audio application is shown, according to an exemplary embodiment. The audio application may be a streaming audio application (e.g., audio is continuously received and played back on the vehicle control system) or otherwise (e.g., audio is downloaded to the vehicle control system and then played back). According to various exemplary embodiments, the application may be an audio application, video application, a combination of an audio and video application, or other media application. The vehicle control system (e.g., control system 106) may receive a request from a user to play streaming audio from an Internet location (step 1201)

A determination is made as to whether a dial-up connection may be formed using Bluetooth connection to a mobile device (step 1202). According to other alternative embodiments, another connection may be used in place of a Bluetooth connection, and another network may be connected to other than a dial-up network. If a connection may be made, a link over the dial up network may be established (step 1204). The link may be a point to point protocol (PPP) link or otherwise.

A determination is made whether the network link signal strength is sufficient (step 1206). For example, the network link may be deemed sufficient if the system determines that streaming audio may be played on the vehicle control system of the vehicle without substantial interruption in the audio output. If the network link is sufficient, a connection to a selected site is made in which audio data may be transferred from the site to the vehicle (step 1208).

The user may exit method 1200 in a variety of ways. The user may manually select to exit method 1200, either via an audible or tactile input (step 1210). If the audio data provided has ended (e.g., a song is done playing, an audio program has finished, etc.), method 1200 may be terminated (step 1212). If the network link that was formed fails for any reason, method 1200 may be terminated (step 1214). Otherwise, the audio data may continue to be played back on an audio system of the vehicle control system.

Training Assisted Via Phone System

Figure 13:
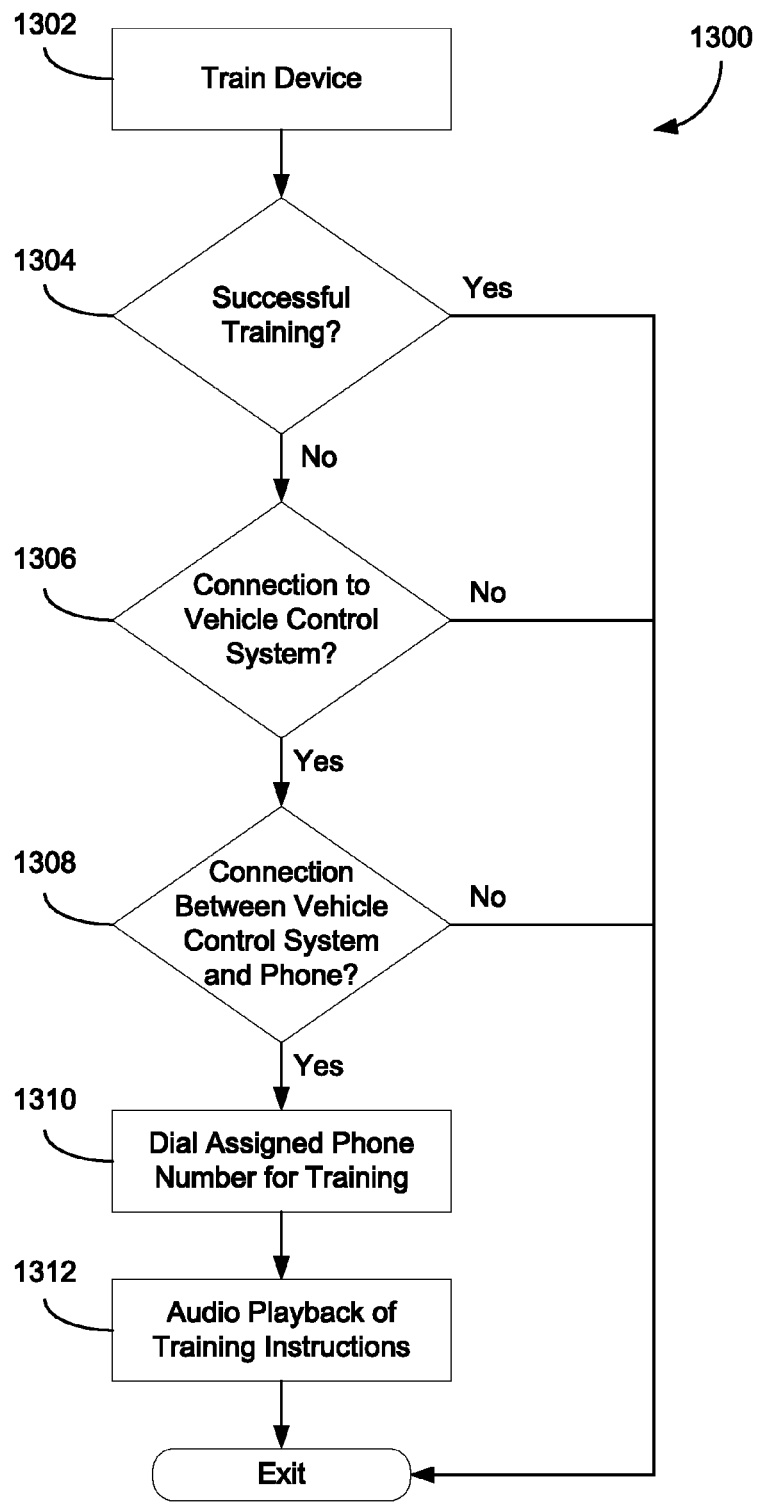
FIG. 13 is a flow diagram of a method of vehicle training using a phone system of the vehicle control system, according to an exemplary embodiment.

Referring to FIG. 13, a flow diagram of a method 1300 for device training using a phone system of the vehicle control system is shown, according to an exemplary embodiment. A phone system may be embedded within the control system, or a cellular phone may be coupled to the control system. Training may relate to a user training a vehicle system on desired settings or preferences for the vehicle system (e.g., HVAC preferences, seat properties (e.g., recline, seat position and location, etc.), etc.). Training may also relate to a user training a universal or trainable transmitter coupled to the vehicle for operative transmission to a target device external the vehicle. For example, training may relate to programming a user interface element (e.g., a button) of a HomeLink® device to activate the transmission of a signal configured to be recognized by a garage door receiver or other receiving device. A training process may be executed to train the device (step 1302). The user may be required to press and/or hold a number of buttons inside the vehicle or to press and/or hold a button on the receiving device. A determination is made as to whether the training was successful (step 1304). This determination may be made by the user, the vehicle control system, or a device to be trained (e.g., a universal transmitter). For example, the user may speak into a microphone or indicate via a tactile user interface (TUI) or graphical user interface (GUI) that training was successful or was not successful. This user input may be in response to a prompt from the universal transmitter or control system to a display or audio playback device. The success of the training may relate to if the user input was understood and the user preference was successfully set by the associated vehicle system. If the training was successful, method 1300 may terminate.

Otherwise, a determination is made as to whether there is a connection to the vehicle control system (step 1306) (e.g., a connection between the component to be trained and the vehicle control system). If so, a determination as to whether a connection may be made between the vehicle control system and a phone or other outside device is made (step 1308). If so, a phone number relating to training assistance may be dialed by a phone system of the vehicle control system (step 1310). The phone number may be a pre-stored number for user assistance or an updated number may be retrieved from a directory or remote source. Audio and/or video playback of instructions for training a device may then be presented to a user of the vehicle and a vehicle system (step 1312). A prerecorded message may be played back for the user, an operator may be available to talk to on the phone line, or any other training method may be used in step 1312.

According to an exemplary embodiment, the device to be trained and/or the vehicle control system obtains information regarding which training step or aspect is failing. Using this information, the device or system may look-up a certain number to dial (e.g., from a look-up table or database). Different numbers may relate to different training problems. Once the number is dialed and a call established, the user may immediately hear a training message tailored to his or her specific problem. According to various other exemplary embodiments, the failure or problem information is transmitted via data communications via an embedded or connected communications device (e.g., embedded phone, connected mobile phone, connected WiFi device, etc.) to a remote source. The remote source may parse the information and based on the parsed information the remote source may tailor the response provided back to the device or system. For example, the remote source may provide a specific recorded message based on the information, the remote source may send display information for output to a vehicle display system, and/or the remote source may connect the user via a voice connection to an appropriate resource.

It is important to note that the user may be provided with the option of calling or receiving assistance in the event of a failure. For example, an audio prompt and/or a display prompt may ask the user whether a call or should be made or assistance otherwise requested. According to various exemplary embodiments, a phone number to call and/or a website to visit may be displayed and/or played back. This may provide the user with the option of receiving assistance at his or her leisure. It is also important to note that the assistance need not be requested via a phone call. For example, the device or system may be configured to request a help file (e.g., text, PDF, etc.), an audio file (e.g., mp3 of instructions, etc.), and/or a website or hypertext page relating to the failure or need for assistance.

Navigation Activities

Figure 14:
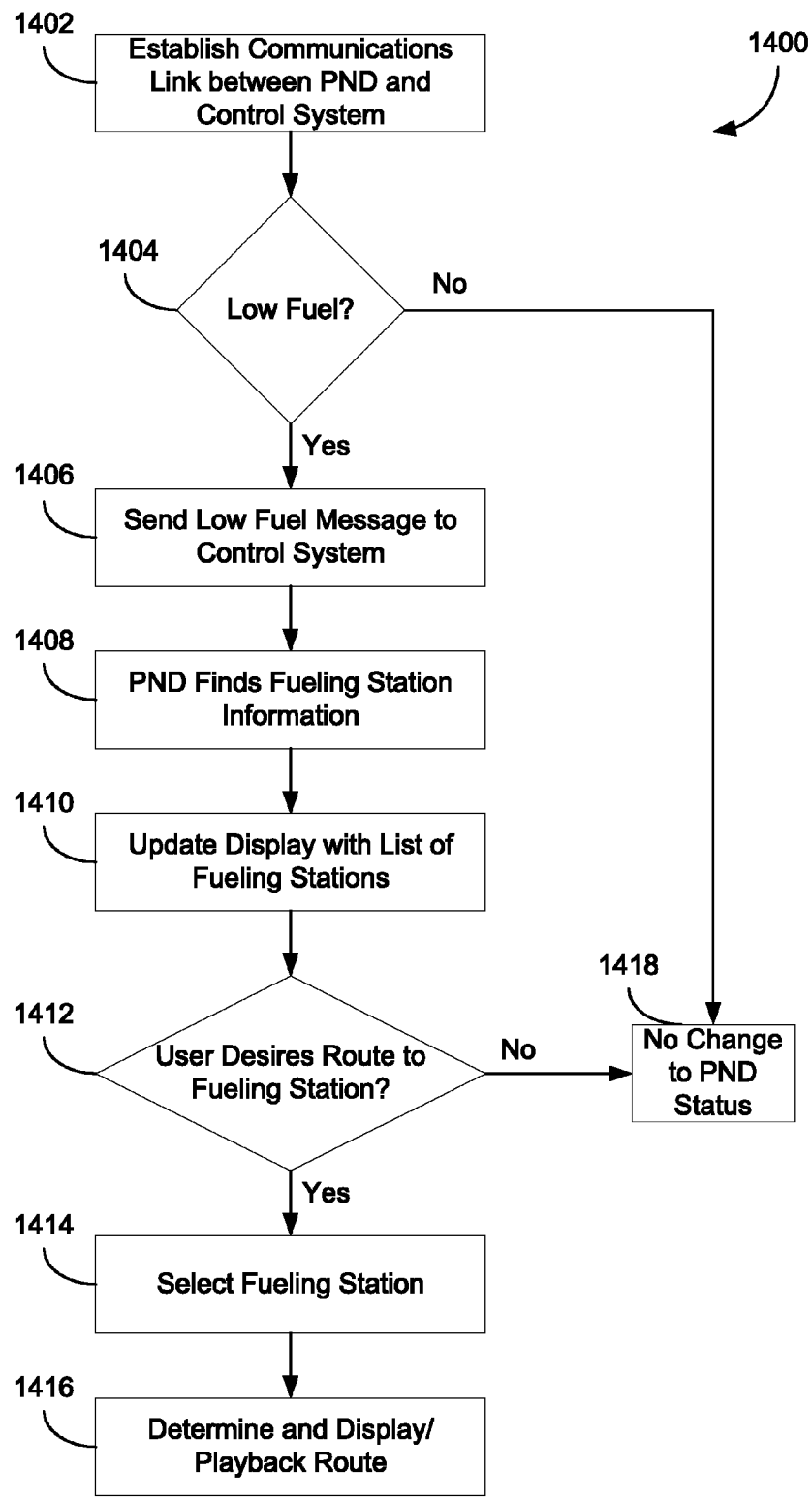
FIG. 14 is a flow diagram of a method of finding a service station using a remote device, according to an exemplary embodiment.

Referring to FIG. 14, a flow diagram of a method 1400 of finding a service station (e.g., a fueling station) is shown, according to an exemplary embodiment. A communication link may be established between a remote source (e.g., a PND) and a vehicle control system (step 1402). A determination may be made as to whether the fuel supply of the vehicle is low or not (step 1404). A signal may be relayed from a fuel tank system of the vehicle via a vehicle data bus to the control system if the fuel tank is low (step 1406). Otherwise, there may be no change to the status of the remote device (e.g., a PND) (step 1418).

If the fuel level is low, the PND finds fueling station information for fueling stations that are nearby (step 1408). The PND may search for all fueling stations within a specific distance or location from the current location of the vehicle. For example, all stations within a certain radius may be found (e.g., 10 mile radius, 20 mile radius, etc.), all stations within a certain time period may be found (e.g., a station that will take 15 minutes to drive to, 20 minutes, etc.), etc. Fueling station information may include an address, phone number, cost of fuel, various specials or coupons associated with station products, etc.

The location of the vehicle as determined by the PND may be altered. For example, the speed pulse, gyro, or reverse gear of the vehicle may be used to adjust the location of the vehicle as indicated by the PND. For example, in the time between steps 1406 and 1408, the position of the vehicle may change. The vehicle control system may gather the various properties of vehicle movement and change the coordinates of the vehicle location as provided by the PND, therefore adjusting the route provided in the steps below, and also adjusting the choices of fueling stations if necessary.

A display system (and/or an audio output system) may be updated to provide the compiled fueling station information to a user of the vehicle (step 1410). The user may indicate a preference to be routed to a nearby fueling station (step 1412). If the user does not want to be routed, no change to the status of the PND occurs (step 1418). If the user does want to be routed, a fueling station is selected (step 1414). The selection of the fueling station may be made by the user either via a tactile input or an audible command. Alternatively, the control system and/or PND may select a fueling station based on distance to travel to the fueling station, the cost of fuel, or any other property selected by either the user or the control system and/or PND. Once the fueling station is selected, the PND may be used to find a route to the fueling station to display and/or playback to the user of the vehicle (step 1416).

Method 1400 may be adjusted to account for other vehicle properties than a low fuel cell. For example, a tire pressure gauge may indicate a problem with a tire pressure, a door or trunk sensor may indicate an open door or trunk while traveling, or the lighting system may indicate a problem with a malfunctioning headlight or brake light and method 1400 may be used to locate a service station, rest stop, or other area where the problem can be resolved. As another example, the vehicle control system may receive weather information from a remote source relating to severe weather (e.g., thunderstorm, snowy or icy conditions, etc.), and method 1400 may be used to determine the safest route of travel (e.g., traveling on a main thoroughfare or highway during icy conditions). In addition, service information or video stream information may be used to signal a need for the vehicle to locate a service station and method 1400 may be used.

Figure 15:
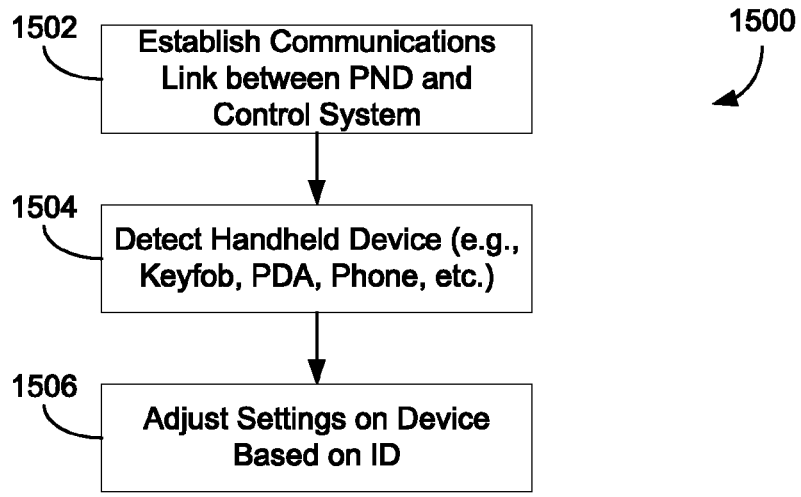
FIG. 15 is a flow diagram of a method of updating preferences on a remote device, according to an exemplary embodiment.

Referring to FIG. 15, a flow diagram of a method 1500 of updating preferences on a remote device, such as a PND, is shown, according to an exemplary embodiment. A communication link between the PND and a control system is established (step 1502). A device (e.g., a key fob, cell phone, PDA, or other personal hand-held device) is detected by control system (step 1504). The detection may occur via a wireless connection (e.g., the device comes within range of the control system) or via a wired connection (e.g., the device includes an interface for coupling to the control system). The device may have a personalized identification (ID) detected by the control system. The device may contain data or otherwise be associated with various settings and preferences for the PND or other remote device. The settings and preferences may be transferred to the PND or other remote device, and the setting and preferences of the PND or other remote device may then be adjusted (step 1506). As an example, a key fob may include settings or preferences relating to a PND, and the connection between the key fob and control system may result in the control system receiving setting and preference information and relaying the data to the PND.

Method 1500 may be adjusted to include transferring setting and preference information between any number and types of devices and remote devices.

Figure 16:
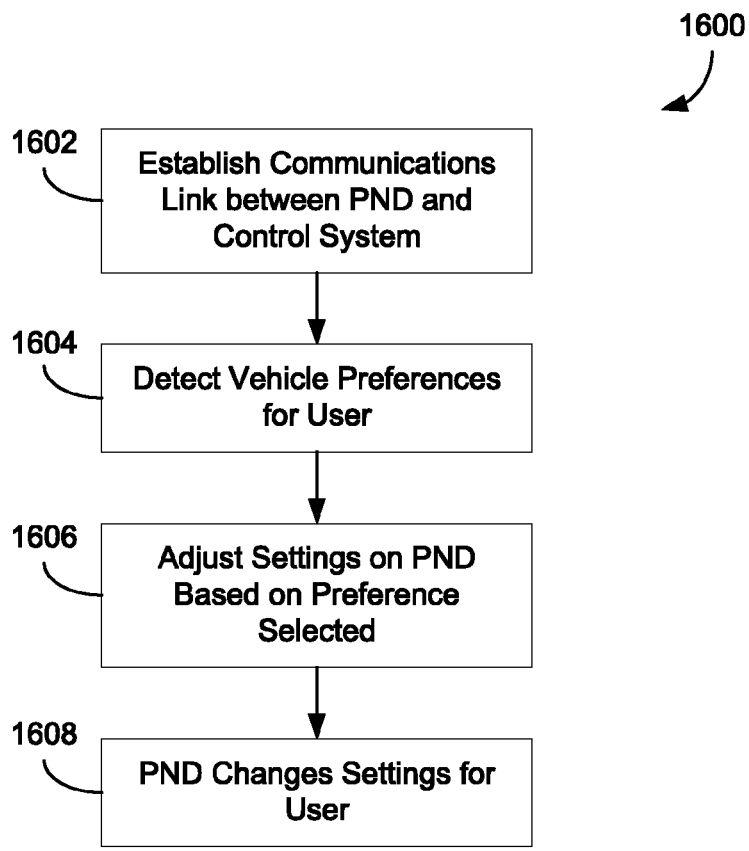
FIG. 16 is a flow diagram of a method of changing settings on a remote device, according to an exemplary embodiment.

Referring to FIG. 16, a flow diagram of a method 1600 of changing settings on a remote device, such as a PND, is shown, according to an exemplary embodiment. A communication link between the PND and a control system is established (step 1602). A vehicle preference may be detected or received (step 1604). According to one embodiment, a user of the vehicle and PND may identify himself or herself to the control system, and the preferences of the user may be stored in the memory of the control system. The user may identify himself or herself via an audible command or tactile input, or the user may have an identification tag or other device that may be detected by a vehicle system of the vehicle control system. Step 1604 may also include the process of the user selecting preferences for the PND, and the selected preferences may or may not be stored in the memory of the control system.

Preferences may includes seat position, side mirror positions, HVAC system settings, etc. Preferences may also include personal settings for a remote device such as a PND. For example, personal settings for a PND may include a map color, map view (e.g., 2-D, 3-D, zoom level, etc.), voice type, language, welcome greetings, itineraries, a favorites menu, safety settings, recent destination listings, home location, music, profiles, etc. The various personal settings of the PND may be set for a particular user of the PND.

Once the user is identified and the preferences of the user are determined, the settings of the PND may be adjusted (step 1606). The PND may store the settings in memory for a particular user. The PND may then update and change the settings for the user (step 1608).

Figure 17:
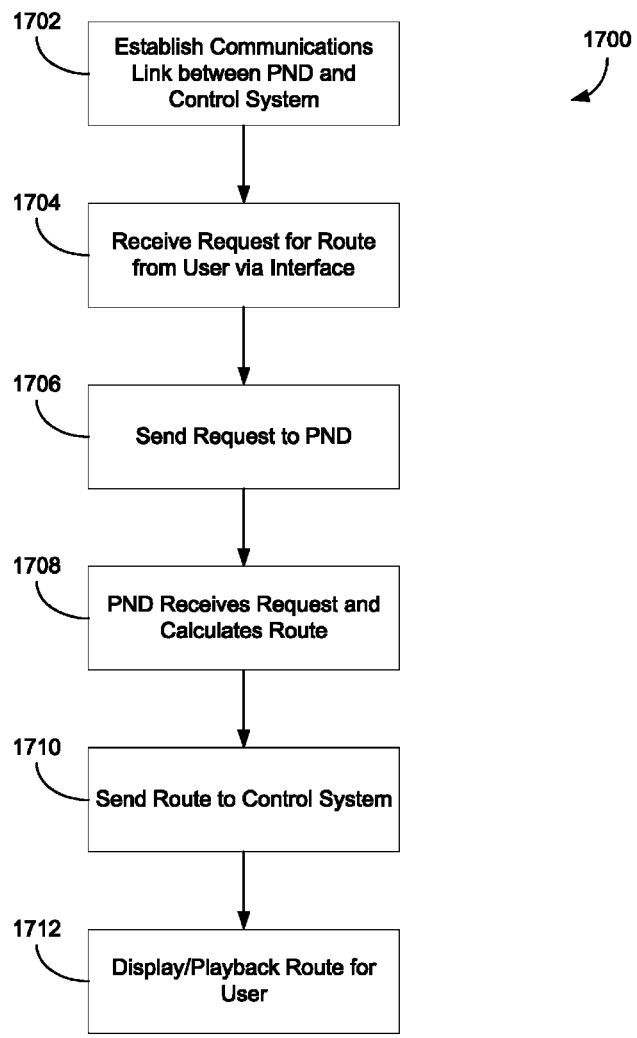
FIG. 17 is a flow diagram of a method of determining a route using a remote navigation device, according to an exemplary embodiment.

Referring to FIG. 17, a flow diagram of a method 1700 of determining a route using a PND or other remote navigation device is shown, according to an exemplary embodiment. A communication link is established between a control system and the PND (step 1702). The control system receives a user input, either via an audible command, tactile input, or other user interface, relating to a request for a route to a specific location (e.g., "home") (step 1704). Examples of other locations may include restaurants, service stations, points of interests (POIs), lodging, etc. The request is sent to the PND (step 1706). The PND may be coupled to the control system via a wired connection, or may communicate with the control system wirelessly.

The PND receives the request and calculates a route based upon the current position of the vehicle (step 1708). The route is sent to the control system (step 1710) and is configured for a display output or audio output device of the vehicle for the user (step 1712).

Method 1700 may be adapted for various purposes. For example, a user of the vehicle may have a "favorites" list of locations which the user may choose to receive a route to. The user may also use method 1700 to "re-route" or calculate a new route to travel from the vehicle's current location to a destination (e.g., traffic, road, or weather conditions may prompt the user to desire a new route). In addition, PND settings may be altered in conjunction with method 1700. For example, zoom settings may be altered (e.g., the user may request a view of the city, country, county, etc., or may request the map to zoom in or out), playback options may be altered (e.g., mute the sound, raise or lower the volume, etc.), etc.

Digital Radio/Media Player Control

One type of media player is a mobile digital radio, for example, a satellite digital audio receiver system (SDARS) or a high-definition digital radio (HD radio). Mobile digital radios may be capable of being moved by a user between the vehicle, office or workplace, home, or other locations (e.g., the user taking the radio into a shopping center, using the radio while at an exercise station, etc.). The mobile digital radio may be a "standalone" device (e.g., the radio is functional without the use of an additional device or may be used in conjunction with another device. The mobile digital radio may generally connect to an audio input (e.g., a computer at a workplace or home, a vehicle control system of a vehicle, etc.) using an audio output device of the mobile digital radio. Alternatively, the mobile digital radio may connect wirelessly with another device.

Other examples of media players may include a satellite radio, an HD SDARS radio, satellite video (e.g., a TV), video via WiMax or other technology, and other handheld video devices.

As discussed in FIG. 3, a vehicle control system may be configured to send and receive data to and/or from a remote source over a communication link. As an example, vehicle control system 106 may input satellite radio service content that is being received in "real time" by the mobile digital radio player, satellite service content that was previously received by and stored in the mobile digital radio player, and/or any other data stored in the mobile digital radio player that is usable by vehicle control system 106.

Figure 18A:
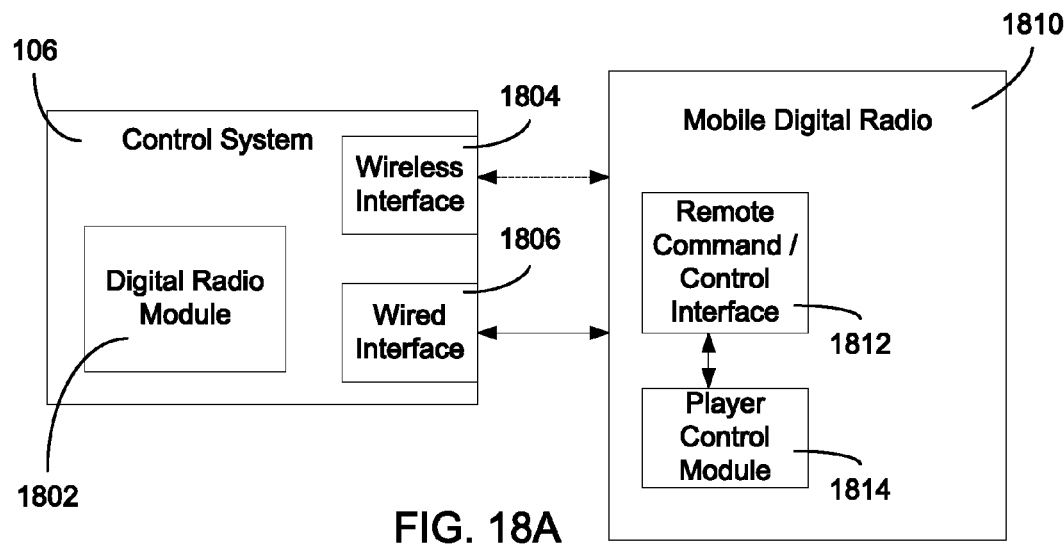
FIG. 18A is a block diagram of a control system coupled to a mobile digital radio, according to an exemplary embodiment.

Referring to FIG. 18A, a block diagram of control system 106 coupled to a mobile digital radio 1810 is shown, according to an exemplary embodiment. Control system 106 may include a digital radio module 1802 configured to accept an input from mobile digital radio 1810 and configure the input for an audio output device of control system 106, as well as be configured to accept an input from an input device of control system 106. Control system 106 may couple to mobile digital radio 1810 either via wireless interface 1804 or wired interface 1806.

Mobile digital radio 1810 may include a remote command and control interface 1812. Interface 1812 may be configured to accept a user input, either via audible command or tactile input, relating to command and control signals. Interface 1812 may pass the received signals to a digital radio player which controls the functions of radio 1810 based on the received signals. In various exemplary embodiments, the functions may include one or more of satellite channel selection, playback of stored satellite radio service content, storing, deleting, and/or otherwise managing received satellite radio service content, volume control, and/or any other current-implemented or later-developed or unimplemented function of radio 1810.

Player control module 1814 may be included in radio 1810. Module 1814 may relate to controlling various functions of radio 1810. The functions may relate to the choice of audio file to play, the genre of audio files to select from, volume levels, and other audio properties. Module 1814 may provide control system 106 with data corresponding to steps 1864-1868 of FIG. 18B. Radio 1810 may include various technologies, hardware, software, algorithms, and any other resource that may be necessary or desirable to effect authentication, encryption, decryption, and the like that may be required to enable interface 1812 to radio 1810.

Figure 18B:
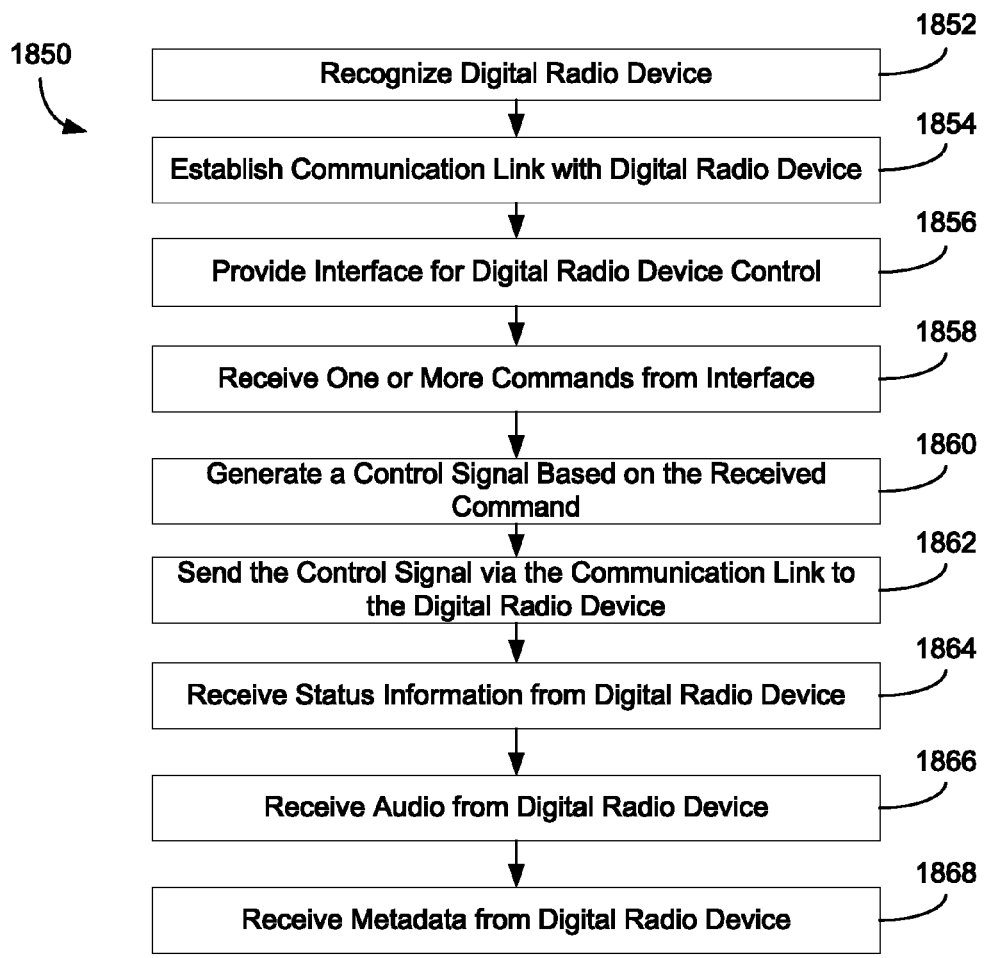
FIG. 18B is a flow diagram of a method of using the digital radio device of FIG. 18A, according to an exemplary embodiment.

Referring to FIG. 18B, a flow diagram of a method 1850 of using the digital radio device of FIG. 18A is shown, according to an exemplary embodiment. A control system of a vehicle may recognize the digital radio device (step 1852). Step 1852 may occur when a user or control system initializes the method, may occur when the digital radio device couples to the control system, or may occur when the digital radio devices comes within a wireless range of the control system. A communication link, either wireless or wired, is established between the control system and digital radio device (step 1854). The control system provides a user interface (e.g., a graphical user interface (GUI), a voice-driven user interface (VUI), a text user interface (TUI), etc.) for a user of the vehicle (step 1856). The user may use the interface to send a command to the digital radio device via the control system. The control system receives the commands (step 1858) and generates a control signal based on the received command (step 1860). The control signal is sent via the communication link to the digital radio device (step 1862).

The digital radio device may provide the control system with status information (step 1864), audio (step 1866), and metadata (step 1868). Status information may relate to the status of the digital radio device (e.g., the products and services offered by the digital radio device, if various products and services are available or not, operational state, status, or associated ancillary information, etc.). The audio may be audio requested by the user via the user interface. Meta information may relate to data associated with the audio (e.g., if a song is provided, artist, album, genre, and other music properties).

Text-To-Voice/Voice-To-Text of Synchronized Data Files

According to various exemplary embodiments, a vehicle control system (e.g., a vehicle control system shown in the FIGS. and described herein) may be configured to provide conveniently activated synchronization, data retrieval or downloading mechanisms that allow transfer synchronization, updating or augmenting of the files into or out of the vehicle control system. The vehicle control system may be configured to include a dictation engine that allow a user to dictate a spoken message using a microphone coupled to the vehicle control system. The dictation engine may convert the dictated speech into text using speech-recognition technology. The text files can be transferred to or from the vehicle control system and any remote destination using any known or later developed wired or wireless technology. The vehicle control system may further be configured to convert text on the text files between full words or phrases and abbreviated text (e.g., "SMS-style" text, "texting" style text, etc.).

Referring briefly to FIG. 2, the operation of pushbuttons 114, either through tactile operation or through oral commands received by the vehicle control system, for message playback may display various menu screens or execute commands that allow the user to select messages for playback, select voices to be used during playback, and/or other playback options as well as to input, view, select, and/or reset information relating to data, information or the like sent by the user from a remote source. The operation of the pushbuttons 114 for the message dictation function may display various menu screens to execute commands that allow the user to input a new message orally to be transcribed into a text message, such as, for example, an e-mail message or SMS message. The pushbuttons 114 for the message dictation function also may display various menu screens to execute commands that allow the user to view, select, send, edit and/or delete previously-dictated messages.

Figure 19A:
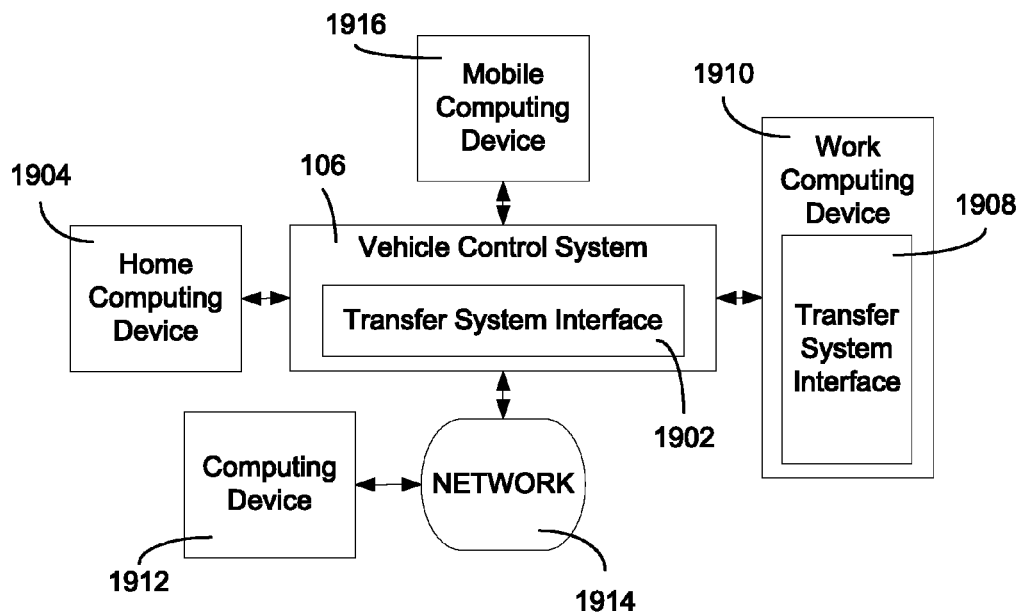
FIG. 19A is a block diagram of a system for synchronizing and/or transferring data between multiple remote locations, according to an exemplary embodiment.
Figure 19B:
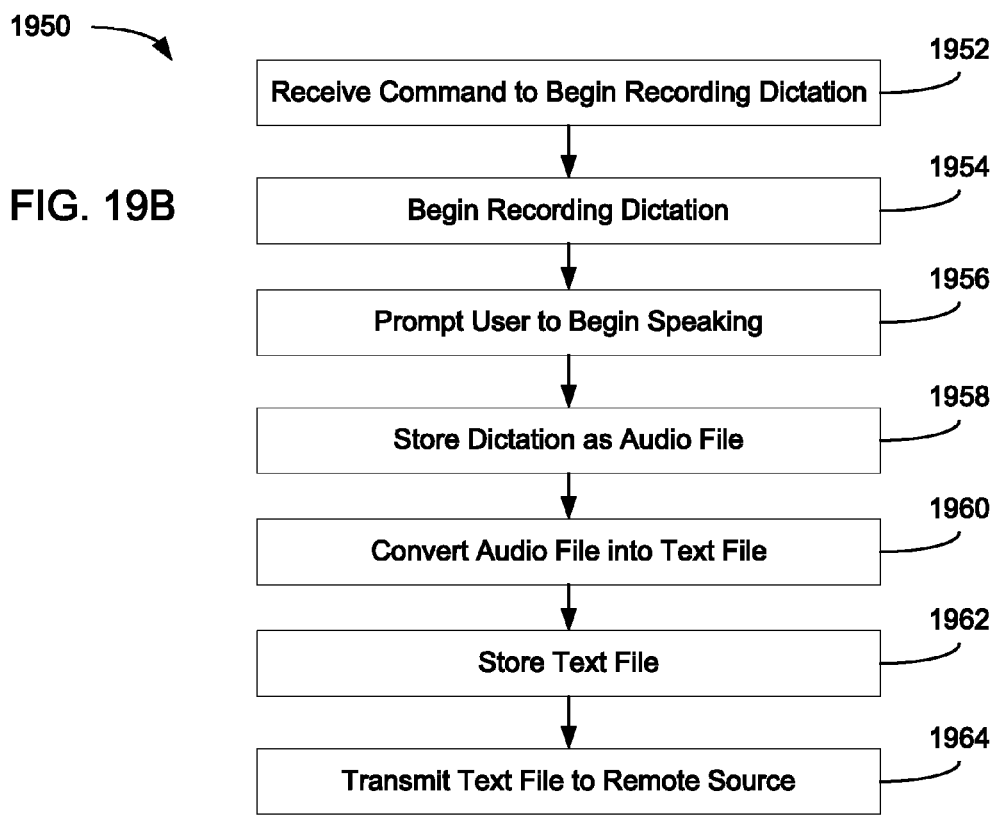
FIG. 19B is a flow diagram of a method for digital dictation using a vehicle control system, according to an exemplary embodiment.

Referring to FIG. 19B, in the flow diagram of method 1950, if the vehicle control system receives a command to begin recording a message for dictation (step 1952), the vehicle control system will begin recording (step 1954) using an audio input device (e.g., audio input device 128). When recording has started, the system may prompt the user to begin speaking (step 1956) or that recording has now begun. Once the user is finished dictating the message, the message is stored in the vehicle control system as an audio file (step 1958). The audio file may be an audio file according to a variety of formats (e.g. a compressed audio file, an MP3 file, a WAV file, an uncompressed audio file, etc.). The resulting audio file may then be converted into a text file (step 1960). The conversion may be completed utilizing a speech recognition module (e.g., device 136). The resulting text file can be sent using any known or later-developed device or method for sending data communications. The resulting text file may also be stored in the vehicle control system (step 1962) for transmission at a later time from the vehicle control system (step 1964). According to various exemplary embodiments, the text message may be transmitted as a data file, such as, for example, an e-mail message or a text message.

Referring now to FIG. 19A, a block diagram of a system for synchronizing and/or transferring text between remote sources and vehicle control system 106 is shown, according to an exemplary embodiment. Vehicle control system 106 may be configured to provide a transfer system interface 1902 to a vehicle display system. According to various other exemplary embodiments, vehicle control system 106 may be configured to provide a transfer system interface to a remote source (e.g., home computing device 1904) via a web server or another service residing on the vehicle control system. According to yet other exemplary embodiments, a transfer system interface 1908 may also or alternatively reside on a remote source (e.g., work computing device 1910).

Referring further to FIG. 19A, computer code residing in memory of control system 106 is configured to facilitate the transfer and/or synchronization of files between computing devices 1904, 1916, 1912 (shown connected to vehicle control system 106 via network 1914), mobile computing device 1916, and/or memory of vehicle control system 106. The transfer system interfaces (e.g., 1902, 1908) are generally configured to allow a user to control the transfer and/or synchronization of the files. According to an exemplary embodiment, the transfer system interface provides the user with an icon for one or more computing devices that may be configured to connect to the vehicle control system and an icon for the vehicle control system. The user may be allowed to drag files or icons to any of the computing devices and/or the vehicle control system. Once a file or device is dragged to a destination for transmission, reception, or synchronization of data files, the transfer system interface and/or other suitable components of the vehicle control system may prepare the file(s) for transmission (e.g., compress the files, package the files, encrypt the files, etc.). The file(s) may then be transmitted to the selected destination, either wirelessly or by wired communications and/or using any other known or later-developed storage and/or transport device or system.

Referring further to FIG. 19A, in embodiments where a remote source includes a transfer system interface (e.g., transfer system interface 1908) or where the vehicle control system may remotely (e.g., wirelessly) provide the transfer system interface to the remote source (e.g., computing devices 1912, 1916, 1904), a user may be able to drag files or devices from memory local to the computing device to an icon representing the vehicle control system. The transfer system interface may then be configured to facilitate the transfer of files from the remote source to the vehicle control system. Transferring files (e.g., particularly text files) from the remote source to the vehicle control system may allow the user to continue to review documents or files while traveling in the vehicle (e.g., using vehicle control system 106 as a text-reader). Once files are received by the vehicle control system, the control system may be configured to prepare the files for display, audio playback, and/or selection by the user. For example, when the vehicle control system powers-up, the vehicle control system may display recently received files to the user via a display system for selection. According to various exemplary embodiments, the user can access the received files through a variety of commands (e.g., tactile commands and/or voice commands). The user may request that the system read aloud a selected text file, where the selected text file is, for example, a word processing document, an e-mail message, an SMS message, a meta-data file, or another type of suitable file. The system may also be configured to read meta-data and/or header information from one or more other files (e.g., media files, etc.). Once selected, the vehicle control system may be configured to convert the text of the selected text file into an audio signal. The signal can be output directly to the audio system and played for the user. By way of further example, once files are received by the vehicle control system, a text-to-speech module (hardware and/or software) may prepare an audio file for playback based on the text. The vehicle control system may be configured to conduct this activity in the background and may provide the user with an indication when a text file has been converted to an audio file and is ready for audio playback.

Referring briefly to FIG. 4, text-to-speech device 138 is generally configured to convert the text and/or numeric data of a data file received from a remote source into an audible speech representation. This functionality may allow the vehicle control system 106 to audibly give data and/or read a text file, message or string to the user via the audio output device 130 or the audio system 104. It is important to note that the text for conversion into an audible speech representation need not be received from a remote source. For example, in addition to "reading" a text file, message or string, the vehicle control system 106 may repeat a user-selected function back to the user, announce media file information, provide phonebook or contact information, provide turn-by-turn directions, turn prompts, or other vehicle navigation data, or other information related to data stored in memory device 132 and/or a remote source.

According to various exemplary embodiments, the vehicle control system may be configured to present the user (e.g., via a GUI or VUI) with a wide variety of choices regarding how the a converted text file should be played. For example, when converting and/or playing back an SMS message, the user could have previously recorded a voice of the audio of the SMS message and stored a representation of the author's voice in the memory of the vehicle control system 106. In various other exemplary embodiments, the user can then use that voice representation when that SMS message is converted from text to speech and played to the user. The user could further purchase or use a representation of a celebrity's voice for a text-to-speech conversion of a text string that is played through the audio system of the vehicle control system.

According to various other exemplary embodiments, the text-to-grammar device 134, the text-to-speech device 138, and/or other hardware/software shown in FIG. 4 are also usable to translate SMS-style shorthand text strings in a message or the like into a commonly understood or more complete utterance (e.g., a proper English language equivalent) before or during processing. The translation may occur prior to processing the text into a phonemic representation for audio playback. By way of example, a user may receive an SMS message formatted using popular shorthand text such as "l8r" for the word "later." In such exemplary embodiments, the text-to-grammar device 134 and/or the text-to-speech device 138 interprets the shorthand text string "l8r" and translates it into the appropriate phonemic representation. In various exemplary embodiments, the text-to-grammar device 134 and/or the text-to-speech device 138 can convert these SMS-style shorthand messages into equivalent utterances, inserting equivalent text into the text message or the like in place of the SMS-style shorthand text strings for display on a vehicle display system.

It should be appreciated that the text-to-grammar device 134 and/or the speech recognition device 136 can automatically or controllably convert recognized words in a dictated message that have SMS-style shorthand text strings into their equivalent SMS-style shorthand text. This activity may occur prior to outputting the recognized text message or text file to a cell phone or other remote source. It should be appreciated that the text-to-grammar device 134 can convert an SMS-style shorthand text strings into a commonly understood utterance (e.g., word, sentence, phrase, proper English, phoneme, phoneme set, etc.) using any appropriate known or later-developed device, system or method, including, but not limited to, a local translation table, accessing a database look-up table, an algorithm designed to translate SMS-style shorthand text strings into the equivalent phonemic representation of English word, or the like. Likewise, the speech recognition device 136 or text-to-grammar device 134 can convert the user's speech into appropriate SMS-style shorthand text strings using any appropriate known or later-developed device, system, or method, including, for example, a local translation look-up table, accessing a remote server database lookup table, an algorithm designed to translate English into SMS-style shorthand text strings, or the like.

Hardware and/or Software Architecture According to Various Embodiments

Figure 20:
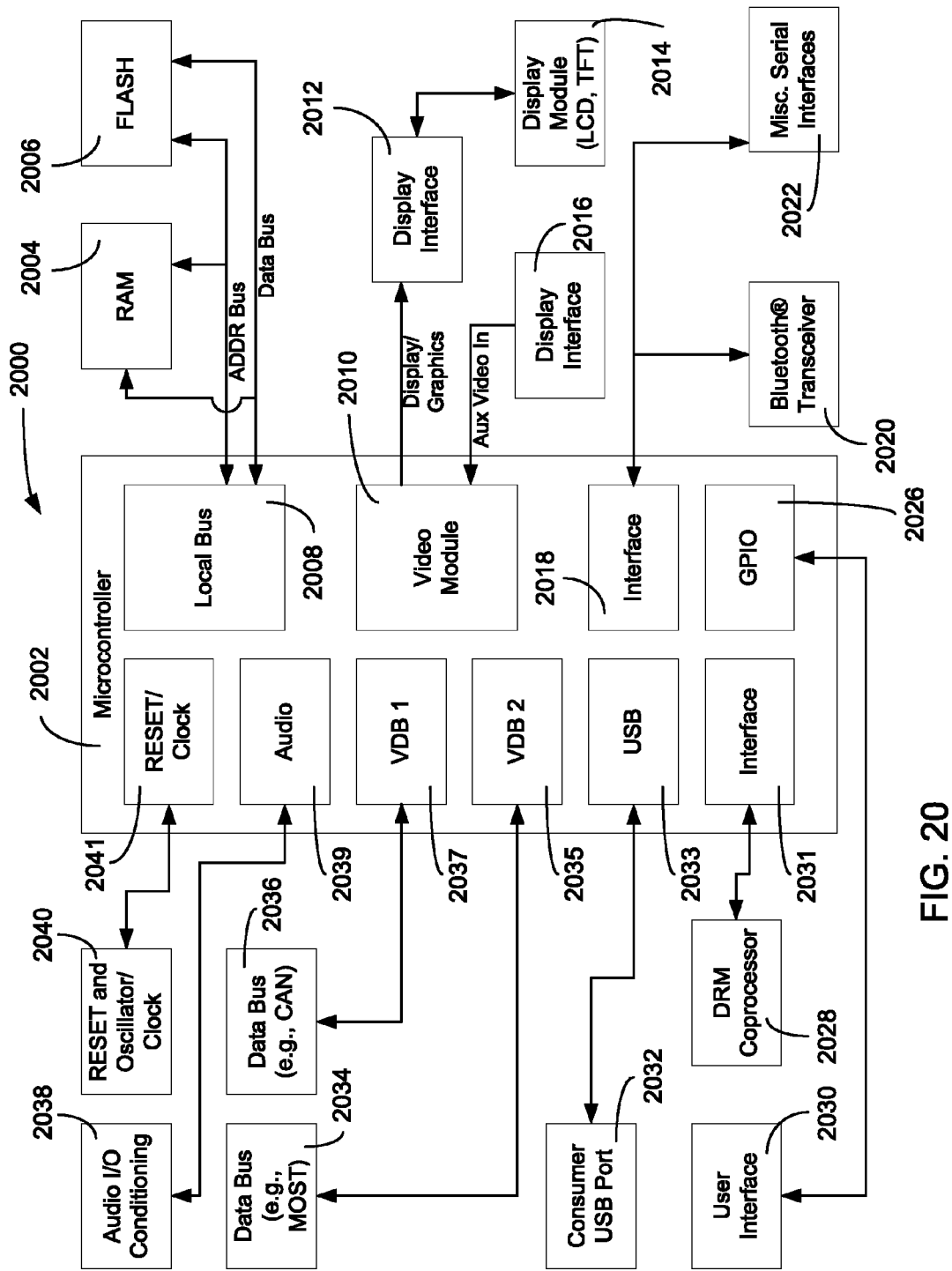
FIG. 20 is a block diagram of a vehicle control system, according to an exemplary embodiment.

Referring now to FIG. 20, a block diagram of a vehicle control system 2000 is shown, according to an exemplary embodiment. A controller 2002 is shown communicably connected to random access memory 2004 and flash memory 2006. Controller 2002 may be a single processor, a single microcontroller, a plurality of processors and/or microcontrollers, an application specific integrated circuit, one or more field programmable gate arrays, a general purpose processor, or any other suitable processing system. According to an exemplary embodiment, controller 2002 is a processor such as the RENESAS® Super SH4R processor.

Random access memory 2004 may be communicably connected to controller 2002 via an address bus and a data bus. Controller 2002 may include a local bus interface 2008 for connecting to the address bus and data bus. Local bus interface 2008 may include hardware and/or software elements for controlling the activities of the address bus, the data bus, random access memory 2004, and/or flash memory 2006.

Controller 2002 may include or be coupled to a video module 2010. Video module 2010 may include a number of hardware and/or software elements for sending and/or receiving a video signal (e.g., an analog signal, a digital signal) to a display interface 2012. Display interface 2012 may include one or more jacks, terminals, or other hardware connections for coupling the system to a display module 2014 (e.g., an LCD display, a TFT display, an OLED display, etc.). According to various exemplary embodiments, video module 2010 is not included on controller 2002. According to yet other exemplary embodiments, display interfaces 2012 and/or 2016 may be integral with microcontroller 2002. Display interface 2016 may generally be configured to receive a video signal from a wired remote source. Display interface 2016 may provide the video signal (changed or unchanged) to video module 2010.

Controller 2002 is further shown to include interface 2018. Interface 2018 may be configured to communicably couple communications devices such as a Bluetooth transceiver 2020 and/or miscellaneous serial communications interfaces 2022 to controller 2002. Various user interface elements 2030 (e.g., buttons, touch screens, joysticks, switches, etc.) may be coupled to controller 2002 via a general purpose input/output interface 2026. According to an exemplary embodiment, interface 2018 is a serial interface.

Various activities of controller 2002 may require or be assisted by one or more co-processors or second controllers. Such devices may include a digital rights management (DRM) co-processor 2028 and may be operatively coupled to controller 2002 via an interface 2031 or any other suitable method. DRM co-processor 2028 may generally be configured to decrypt and/or unlock digital media files protected by digital rights management access control methods. According to an exemplary embodiment, interface 2031 is a serial interface.

Controller 2002 is further shown to include a universal serial bus (USB) interface or host 2033 which may support a USB port 2032. Components 2033 and 2032 may be USB components configured to be compatible with any past, present, or future standard for USB interfaces.

Controller 2002 is further shown to include an audio input/output conditioning module 2038 coupled to an audio interface or audio bus 2039. Audio conditioning module 2038 may include hardware and/or software configured to provide digital signal processing, filtering, noise reduction, and/or any other conditioning activity. According to an exemplary embodiment, controller 2002 is further shown to include a RESET and Oscillator/Clock 2040 coupled to an interface 2041 for coupling controller 2002 to the device 2040.

Controller 2002 is shown to include vehicle data bus interfaces 2035 and 2037. Vehicle data bus interfaces 2035 and 2037 may be of the same or different types. For example, vehicle data bus interface 2035 may be configured to communicate with a media oriented systems transport (MOST) compatible data bus 2034 while vehicle data bus interface 2037 is configured to communicate with a controller area network (CAN) bus 2036. According to an exemplary embodiment, different vehicle data bus types may be provided. For example, a vehicle data bus of the system may be an IEBus (e.g., GA-NET bus). According to an exemplary embodiment, at least one vehicle data bus interface of controller 2002 is an arbitrated bus or an arbitrated audio bus such as a GA-NET compatible bus. According to various exemplary embodiments the arbitrated bus is dedicated to audio activities. In addition to the arbitrated audio bus, a separate audio/video specific bus may be provided (e.g., a rear seat entertainment system bus, a video bus, a data/video bus, a data bus, etc.).

Figure 21:
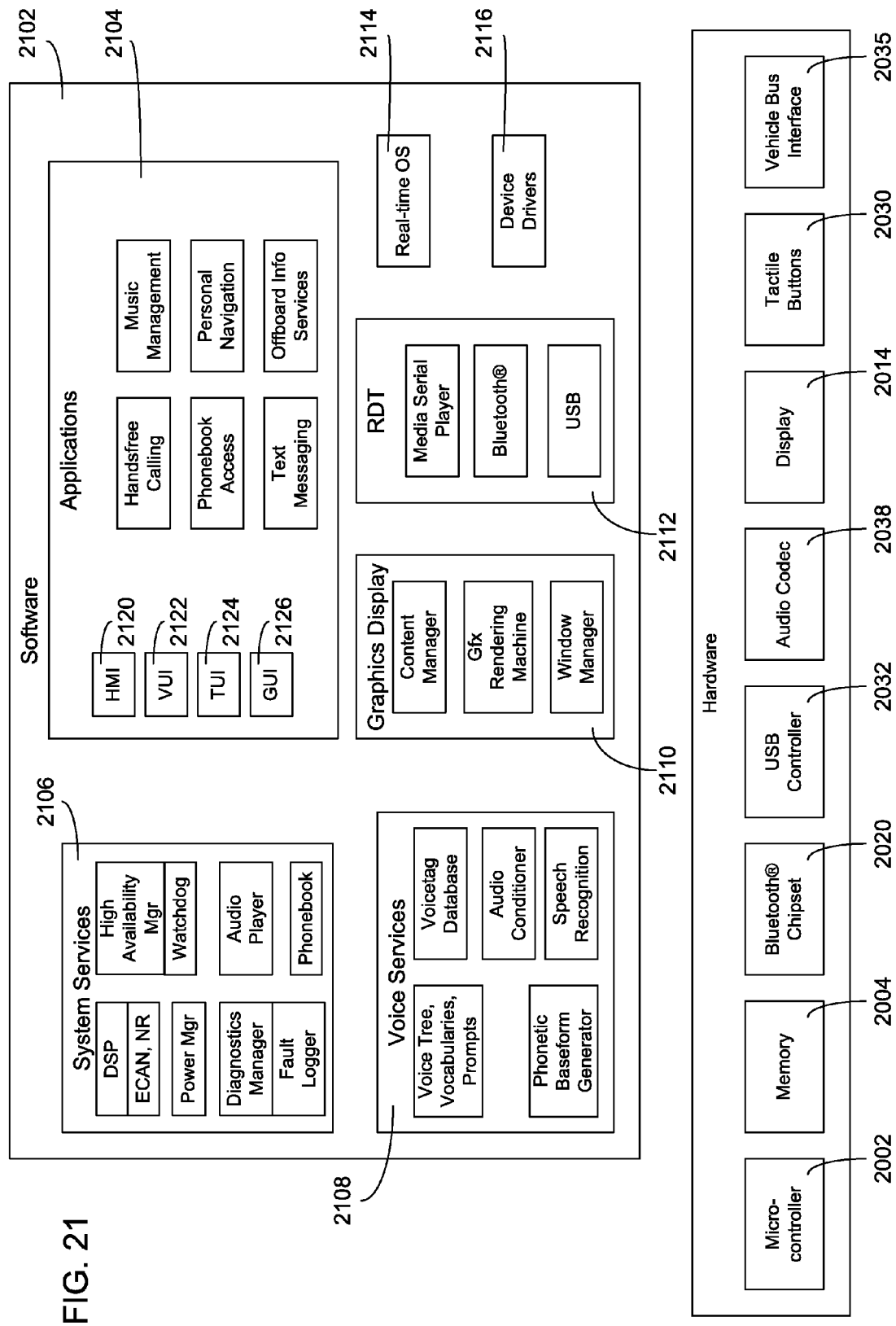
FIG. 21 is a block diagram of a functional software and/or hardware architecture of a vehicle control system, according to an exemplary embodiment.

Referring now to FIG. 21 a high level block diagram of the functional software and/or hardware architecture of system 2000 is shown, according to an exemplary embodiment. Software 2102 may generally reside in memory 2004 and/or 2006 and may include software code for undertaking the various activities described herein. System 2000 is shown to include applications 2104, system services 2106, voice services 2108, a graphics display module 2110, a remote device transport module 2112, a real time operating system (OS) 2114, and device drivers 2116.

Referring further to FIG. 21, according to an exemplary embodiment, applications 2104 may include a wide variety of applications configured to provide features to the system and/or the user. For example, applications may include hands-free calling applications, phonebook access applications, text messaging applications, music management applications, personal navigation applications, and/or off board information services applications. Applications 2104 of software 2102 may further include a human machine interface module 2120, a voice user interface module 2122, a tactile user interface module 2124, and a graphical user interface module 2126. Modules 2120-2126 may generally be configured to allow a user of the system to interact with any other applications and/or hardware by providing menu items, prompting, input logic, and/or any other user interface features.

Referring further to FIG. 21, an operating system 2114, such as a real-time operating system (e.g., a real-time operating system as provided by QNX), may be installed on the in-vehicle control system. According to an exemplary embodiment, the operating system is near real time or is an operating system classified as real time. According to an exemplary embodiment, operating system 2114 is an operating system that may be subject to deadlines for critical tasks. Operating system 2114 may be a soft real-time system, a hard real time system, an immediate real time system, or any other type of real time system. According to various other exemplary embodiments, operating system 2114 may be any commercially available or proprietary operating system and need not be a real time operating system. System services 2106 may include modules or software components such as digital signal processing (DSP) components, E-CAN, NR components, a high availability manager, watchdog components, power manager components, diagnostics manager components, a fault logger, an audio player (e.g., aplay), a phonebook component, and any other service that may facilitate the activities described in the present application. Voice services 2108 may include voice trees, vocabularies, voice prompt components, a voice tag database, a phonetic base form generator, speech recognition hardware, an audio conditioner, and/or any other components that may facilitate voice services. Graphics display 2110 components may include a content manager, a graphics rendering engine (e.g., a 2D or 3D rendering engine), a window manager, and/or any other components that may facilitate controlled graphics display. A remote device transport (RDT) subsystem 2112 may include any number of components for facilitating connections to remote sources or devices (e.g., a Bluetooth software component, a USB software component, a serial media player software component, etc.).

Figure 22:
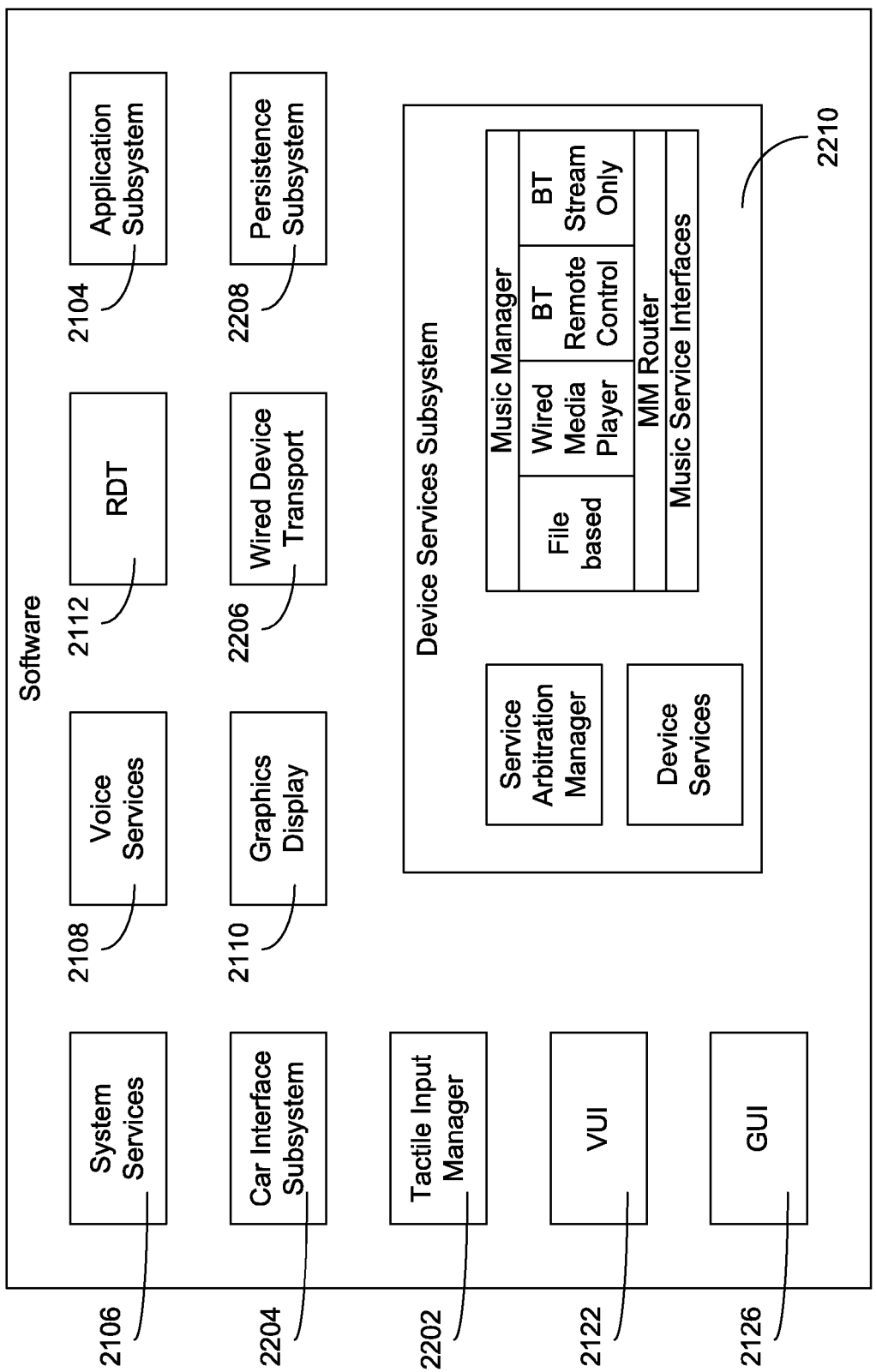
FIG. 22 is a block diagram of a software architecture for a vehicle control system, according to an exemplary embodiment.

Referring now to FIG. 22, a block diagram of a software architecture, such as system 2000 shown in FIG. 20, for a vehicle control system, according to an exemplary embodiment. System 2000 is shown to include a persistence subsystem 2208. Persistence subsystem 2208 may be a software module configured to ensure that certain data remains persistent and/or highly available to the operating system or other software/hardware. If operating system 2114 is a real time operating system, persistence subsystem 2208 may assist operating system 2114 in tracking and/or retaining high-priority data. Persistence subsystem 2208 may maintains high-priority data in highly available memory in a way that the data will not be purged from the highly available memory until the data is no longer needed. Persistence subsystem 2208 may be configured to prioritize data, tasks, memory, threads, processes, and/or other important data structures or activities.

Wired device transport 2206 is a module configured to communicate and control connected portable wired devices. For example, wired device transport 2206 may communicate and control one or more physically connected devices. For example, the physically connected device(s) may include: a USB mass storage device, a USB "PlaysForSure" media player, an iPod media, a media player of any other type, a device wired to the system via an auxiliary audio jack and/or any other wired device. Wired device transport 2206 may include separate software modules to manage the different device types. Wired device transport 2206 and/or its software modules may be configured according to a common application programming interface (API).

System 2000 is shown to include car interface subsystem 2204. Car interface subsystem 2204 is generally configured to provide a software interface and functions for communicating with the vehicle data bus and/or vehicle components thereof. System 2000 is further shown to include tactile input manager 2202. Tactile input manager 2202 is generally configured to provide a software interface and a set of functions for communicating with tactile devices of the vehicle control system.

Referring still to FIG. 22, device services subsystem 2210 is shown to include a music manager. The music manager may be a music service that is used to service music devices such as file based music devices, wired media players, and/or Bluetooth devices.

Referring further to FIG. 22, a connection priority manager 2290 is shown, according to an exemplary embodiment. Connection priority manager 2290 is a software module configured to manage the priority of connected devices for accomplishing key features. Connection priority manager 2290 may maintain a list of one or more key features that may utilize a source (e.g., audio source, video source, navigation source, data source, network source, phone source, etc.). Connection priority manager 2290 may provide the user via a GUI, TUI, and/or VUI, menus for reconfiguring the priority for each feature and/or source type. Using the input received from these menu's, connection priority manager 2290 may connect to and/or utilize a device of the highest priority when the feature is requested to be used. By way of example, if a user or user's family owns multiple phones that may be used for data or network services, connection priority manager 2290 may provide a list of phones in order of priority. The user may reorder the list. If multiple phones are available in the vehicle, the connection priority manager may access the reordered list to determine which to use for a data connection activity. Similar activities and/or menus may be provided for media devices, navigation devices, and/or any other device type.

Figure 23:
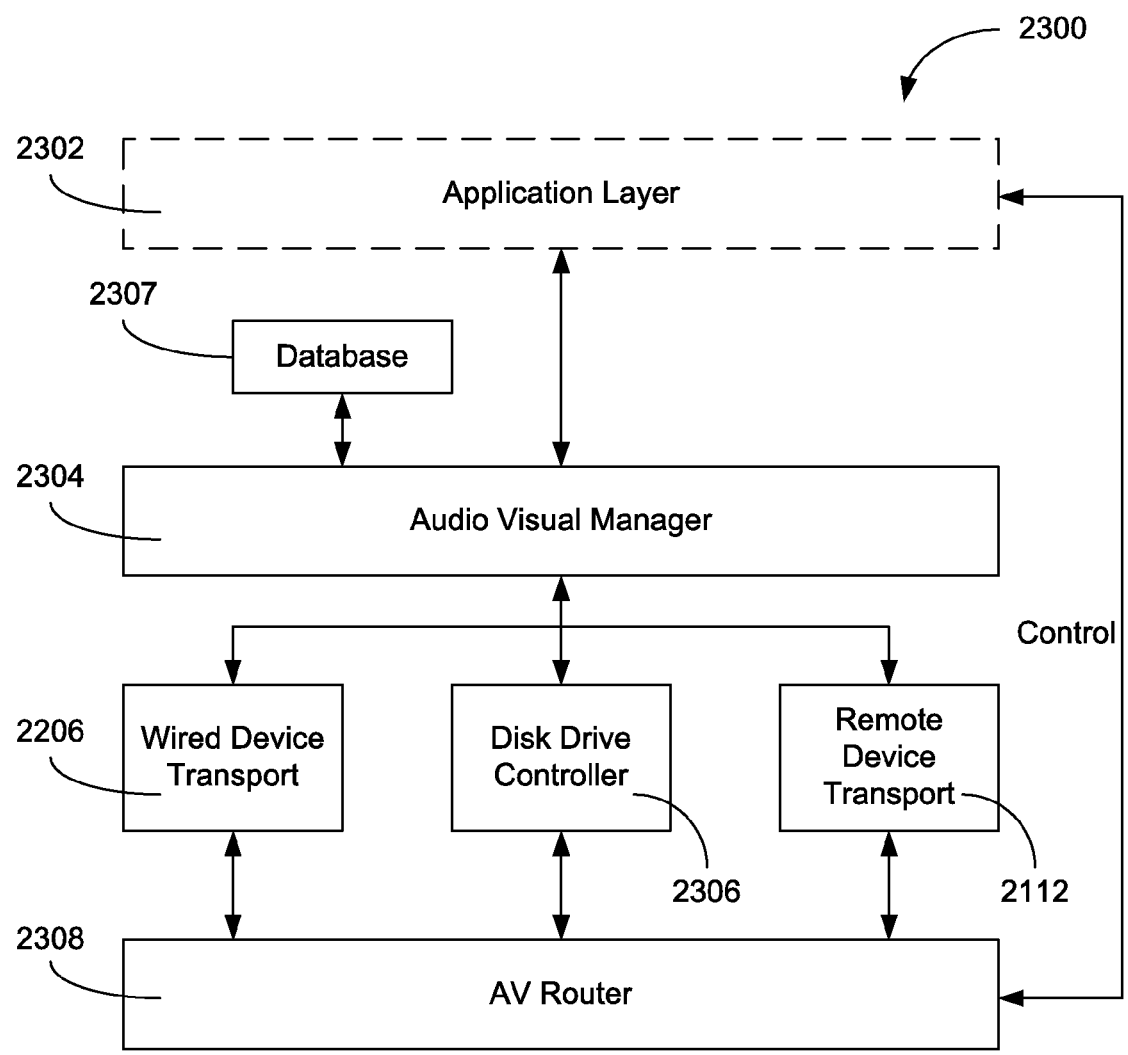
FIG. 23 is a block diagram of a system for providing control signals to a vehicle control system and/or software, according to an exemplary embodiment.

Referring now to FIG. 23, a block diagram of a system 2300 for providing control to the systems and/or software shown in FIGS. 20-22 is shown, according to an exemplary embodiment. System 2300 may generally be configured to provide a unified known interface for applications residing in the application layer 2302 and hardware devices connected to the audio/video (AV) router 2308. According to an exemplary embodiment, system 2300 may provide an alternative to the music manager shown in device services subsystem 2210.

System 2300 is shown to include an audio visual manager 2304. Manager 2304 is configured to provide a common manager and application programming interface (API) to application layer 2302 for the transports and controllers in lower layers. Manager 2304 advantageously provides a common interface to the application layer so that application developers need not be concerned with handling one device differently from another. The API of manager 2304 is used to communicate with all device types. The API may receive calls from applications and interface with the appropriate device controller or transport so that the unique protocol and/or state of that controller or transport can be managed. Manager 2304 is configured to communicate with a remote device transport 2112, a wired device transport (WDT) 2206, and a disc drive controller (DDC) 2306 for controlling a disc related device (e.g., a DVD drive). According to an exemplary embodiment, manager 2304 includes an API server and/or functions while the application layer includes a corresponding API client. The application layer utilizes the manager API to communicate and control wired and unwired media devices. According to various exemplary embodiments, the application layer has a direct connection to manager 2304 to control the AV router.

Referring further to FIG. 23, AV router 2308 is configured to provide the interface between the multiple AV inputs and multiple outputs of the system. The AV router may be configured to receive independent control signals from the application layer so that input selection, output selection, and/or audio level can be adjusted independently of activities of the audio visual manager. AV router 2308 advantageously allows users to connect a variety of audio and/or video sources to the system. To initiate the functional input connection of devices to AV router 2308, WDT 2206 and/or DDC 2306 control the creation and setup of an input channel. WDT 2206 and/or DDC 2306 may also send control signals to AV router 2308 to set the audio input level. Application layer 2302 is configured to manage which AV router input is routed to which AV router output. Application layer 2302 is also responsible for adjusting the AV router's audio output level. According to an exemplary embodiment, all audio, including phone and prompts, are routed through AV router 2308.

Referring still to FIG. 23, database system 2307 may be communicably coupled to manager 2304. Database system 2307 is generally configured to store metadata and lists relating to music, video, and image files. According to an exemplary embodiment, database system 2307 cross references the metadata to a particular device using an index number to a device signature stored in a device manager database. According to an exemplary embodiment, the metadata stored for audio (and/or video files) is album, artist, song title, genre, and track number. Any number of additional metadata components may also be included. According to an exemplary embodiment, database system 2307 is an SQL database with all device metadata stored in a single database file or in separate files for each device. The database file or files are configured to be placed and/or accessed in RAM at runtime, and will be stored (or updated in) to flash memory whenever a device catalog is changed or deleted. According to an exemplary embodiment, database system 2307 is responsible for building, managing, and storage of temporary browse, shuffle and catalog-based lists (e.g., an aggregated catalog). According to various exemplary embodiments, anytime a list is generated, a key will be generated which will contain the necessary information to generate a particular list. This method permits only the key to be stored in the database system during a power cycle, saving on database size. In such embodiments, the lists will be stored in a RAM based database file and will not be written to flash. Using the keys, the database system may regenerate lists each time power is cycled back on.

Referring yet further to FIG. 23, disk drive controller (DDC) 2306 is a software module that is configured to communicate with and control the disk drive. According to an exemplary embodiment, when the disk drive controller 2306 detects that a file based disk (CD-ROM or DVD-ROM) has been inserted, DDC 2306 will send a notification to the wired device transport (WDT) 2206. The wired device transport 2206 may then be configured to mount the disc as a file-system and manage cataloging and/or playback of the disc contents as necessary. According to various other embodiments, audio visual manager 2304 or an application conducts the cataloging and/or playback after triggering by WDT 2206 and/or DDC 2306.

It is important to note that the varying input devices of the in-vehicle control system (e.g., VUI, GUI, TUI, etc.) may each be used to provide user input commands to and/or to provide human-machine interface interaction with varying applications of the system. The unified application programming interface and/or command/control interface provided by system 2300 may advantageously facilitate a unified look and feel for various applications of the in-vehicle control system (e.g., a text messaging application, a hands-free application, a phone application, a digital radio application, etc.).

Media Device User Experience Improvement/Background Authentication

Figure 24A:
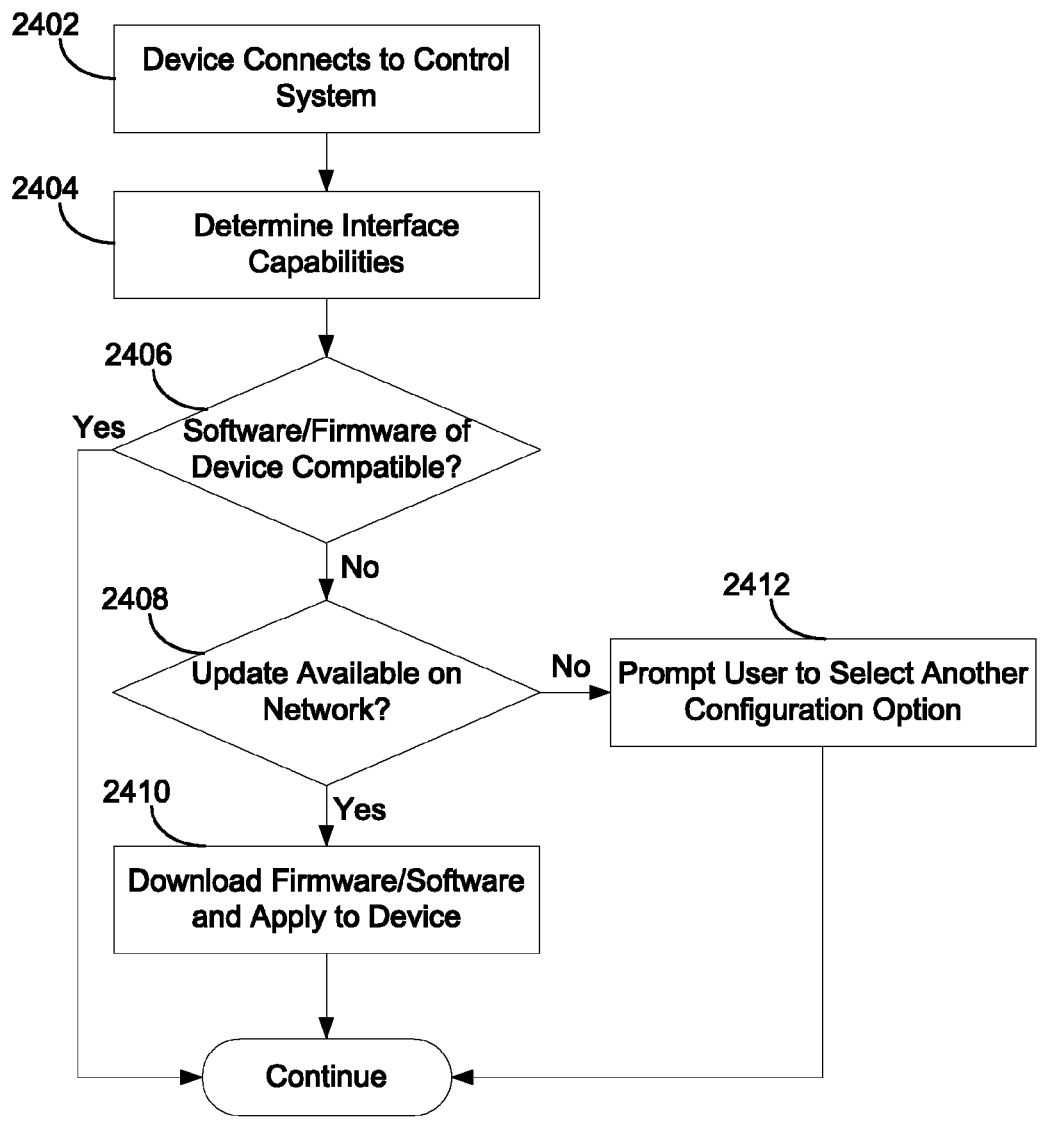
FIG. 24A is a process flow diagram of a method for determining compatibility between a device and a vehicle control system, according to an exemplary embodiment.

The vehicle control systems shown in previous FIGS. and described in the present application may be configured to connect to media devices such as an iPod device sold by Apple, Inc. Referring to FIG. 24A, according to an exemplary embodiment, when a user connects a media device to the vehicle control system (step 2402), the system will attempt to determine the device's interface capabilities (step

2404). This step may include querying the device for a feature set, querying the device for a version number or identifier and using a look-up table in memory of the vehicle control system, or any other activity that may result in the vehicle control system knowing which features the media device includes or does not include. The system may also attempt to check for compatible firmware or application software of the media device (step 2406). If the firmware (and/or application software) is out of date, the vehicle control system may be configured to check the Internet or another remote source for a new or compatible version (step 2408). Checking the Internet or another remote source for firmware may include forming a connection using one or more communication devices of the vehicle control system. If new firmware is available, the system may be configured to download the new firmware and to provide the firmware to the media device (step 2410). According to various other embodiments, the system informs the user that an update is available, but does not attempt to download the new firmware and update the media device without user confirmation. If new firmware is not available (or if the user does not update the firmware), the user will be prompted to select another configuration option (step 2412). Alternatively, the system may select a compatible configuration option and inform the user that the user experience may be slightly degraded until the user updates his or her media device.

Some media devices such as the iPod device sold by Apple, Inc. require authentication before some features such as digital audio and/or a high degree of control are allowed to be provided from the iPod to another device such as the vehicle control system. According to an exemplary embodiment, a memory device of the vehicle control system includes computer code for permitting playback from a media device during that media device's authentication activities. If the authentication process is successful, the playback will continue and the user will not be aware that this background authentication occurred. If the authentication fails, the user will only be permitted playback for a certain amount of time. Once the time expires, the user will be notified that the authentication process failed. According to an exemplary embodiment, the authentication occurs in the background with respect to a primary task (e.g., audio playback, media cataloging, etc.) relating to the media player. A software module of the control system may accomplish this background authentication utilizing a number of different methods. For example, the primary task and the authentication may occur in parallel if the system is capable of conducting parallel processing. By way of further example, the system may be configured to use available or null CPU time to conduct the authentication in a way such that a user will not notice an interruption of the primary task. According to yet other exemplary embodiments, the primary task may be provided with a higher priority and the authentication with a lower priority.

Media Cataloging/Device Aggregating

Figure 24B:
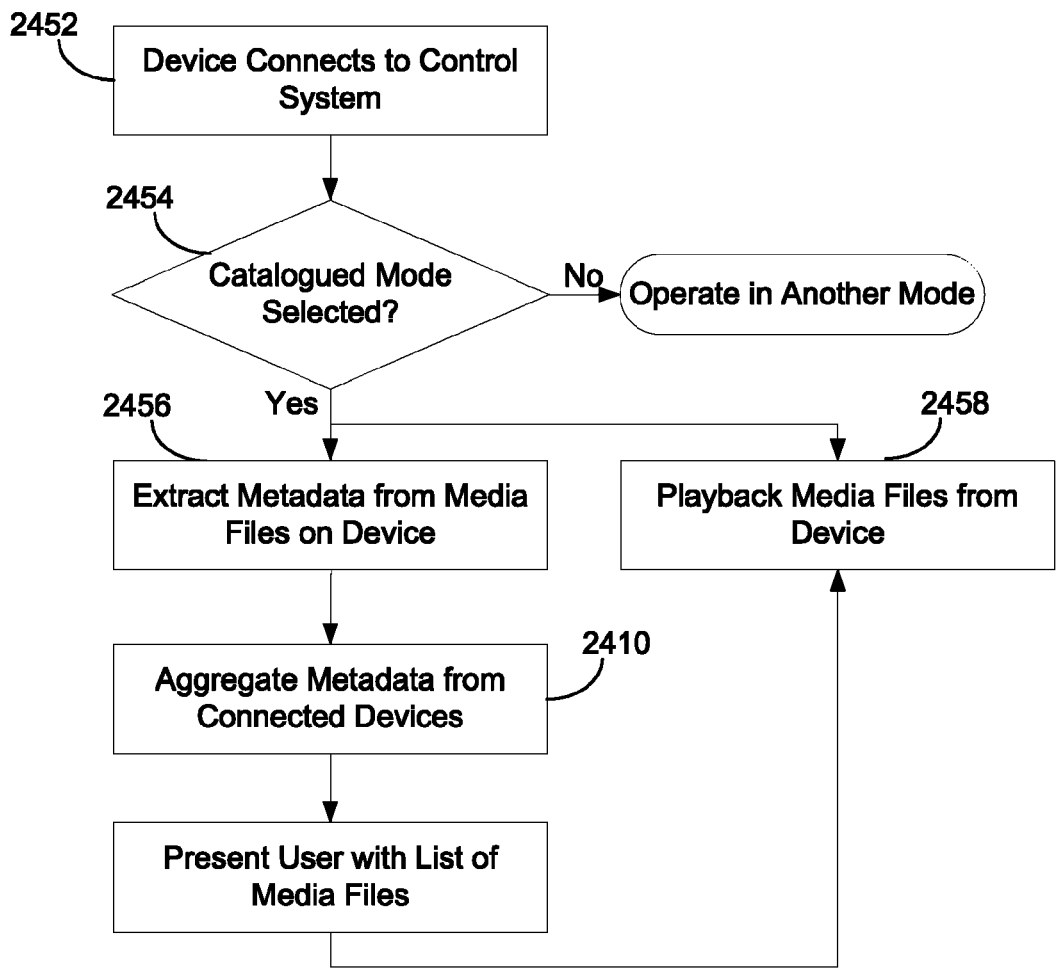
FIG. 24B is a process flow diagram of a cataloguing method between a device and a vehicle control system, according to an exemplary embodiment.

Referring to FIG. 24B, according to an exemplary embodiment, when a device containing media files is connected (step 2452) to the vehicle control system, the user will be provided with the option to operate in one of three modes (step 2454): uncataloged mode, browse mode, or cataloged mode. In uncataloged mode, the user will be permitted to navigate and/or play files sequentially using a limited command set such as: play, pause, stop, next, and previous. In browse mode the user may be provided a file structure view (e.g, a "file tree" view, a "file system directory" view, a file list, a display of file icons, etc.) interface, allowing the user to browse the file structure of the media device for files to access. Metadata may be used to describe the files and/or the file names may be displayed or read to the user. In cataloged mode, the user will have the option to catalog the device into lists (e.g., lists such as genre, artist, album, song title, user playlist, etc.).

In cataloged mode, according to an exemplary embodiment, once a device is connected, the vehicle control system may extract the metadata for the media files on the device (step 2456). While catalog information is being extracted, the user will be able to play contents from the device (step 2458). In other words, the vehicle control system will be able to simultaneously catalog metadata files and to play an audio file. The cataloging my occur in the background during the playback.

Metadata for media files may be formatted according to different versions, file formats, and/or file types. For example, MP3 media files may include a metadata container according to ID3 version 1 or ID3 version 2. Other types of media files may include other types of metadata containers. During the step of extracting metadata for media files on the device to support the cataloging mode, the system may search for a preferred metadata type and version. If the preferred metadata type and/or version is found, the data is used to populate the catalog. If the metadata type and/or version is not found, an alternative type and/or version is searched. In this manner, a catalog may be built even if the media files are of different types and include varying metadata types/versions. According to an exemplary embodiment, the order of which type and/or version of metadata file to prefer is user configurable.

For devices that are cataloged, the vehicle control system may be configured to aggregate the data from all connected devices (step 2460) and to present the user with a complete list (step 2462) of songs, albums, artists, genre, or playlists. The vehicle control system may be configured to allow the user to turn the device aggregation feature off and/or on.

Referring further to step 2460, multiple devices could be connected to the (FIG. 8) the vehicle control system simultaneously. After viewing the complete list of songs, albums, artists, etc. available from the multiple connected devices, the vehicle control system will allow the user to make a selection for playback, transfer, editing, or some other activity. According to an exemplary embodiment, step 2460 includes determining which of the multiple devices contains the selection and accessing the appropriate device to conduct the activity. The determination process may include accessing an identifier, look-up table, database or another information structure associating displayed media files with source devices.

While the exemplary embodiments illustrated in the Figures and described herein are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system 106, memory device 132, communications device 120, data processing device 122, remote source 116, remote server 154, etc.), the position of elements may be reversed or otherwise varied (e.g., the components of control system 106, etc.), and the nature or number of discrete elements or positions may be altered or varied (e.g., communications device 120, memory device 132, the components of control system 106, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either wired, wireless, physically connected, or a combination of wired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

The invention claimed is:

1. A control system for mounting to a vehicle and for providing information to an occupant of the vehicle from a first source device and a second source device, the vehicle including an audio system or a display system, the system comprising:
   a first interface for communicating with the first source device;
   a second interface for providing a signal to the audio system or the display system;
   a third interface for communicating with the second source device;
   a processor;
   a memory unit communicably connected to the processor and including:
      a single local database for storing metadata extracted from the first source device and the second source device locally in the memory of the control system;
      a first transport configured to send a control signal to the first interface;
      a first manager configured to receive a command from an application and to translate the command from the application into a command for the first transport, wherein the first manager is a common manager for sending control signals to the first interface and the second interface using one or more transports;
      computer code for extracting metadata from media files on the first source device and the second source device and storing the metadata extracted from both the first source device and the second source device in the single local database stored in the memory, wherein the metadata is extracted automatically and stored in the single local database in response to the first source device or the second source device being connected to the first interface or the third interface;
      computer code for cataloging the stored metadata in the single local database into an aggregated list and providing the aggregated list to the second interface for display to a user such that the user is presented with metadata corresponding to the media files on both the first source device and the second source device; and
      computer code for automatically updating the aggregated list in response to the (i) first source device being connected to the first interface for a second or later time and (ii) a change in the media files stored in the first source device.

2. The system of claim 1, wherein the memory unit includes computer code for generating a second manager when the second source device is communicably connected to the third interface.

3. The system of claim 2, wherein the second manager is associated with the second source device and the first manager is associated with the first source device.

4. The system of claim 1, wherein the first source device is a digital radio device and wherein the application is configured to allow the occupant to control operation of the digital radio device via the control system.

5. The system of claim 1, further comprising:
a fourth interface for receiving audio signals from a microphone mounted to the vehicle;
wherein the memory unit includes computer code for facilitating the dictation of speech received at the microphone and provided as the audio signals to the second interface.

6. The system of claim 1, wherein the application is a text messaging application for providing a text message received from the first source device to the audio system or the display system, wherein the application is further configured to provide the user with a plurality of options for responding to the text message received.

7. The system of claim 1, further comprising:
a phone module for mounting to the vehicle, the phone module configured to receive data from a remote source; and
an interface to a vehicle actuator;
wherein the memory unit further includes:
computer code for parsing the information received at the phone module from the remote source; and
computer code for sending a command signal to the interface.

8. A method for providing information to an occupant of the vehicle from a first source device and a second source device, the vehicle including an audio system or a display system, the method comprising:
establishing a communications link with the first source device;
establishing a communications link with the second source device;
providing a first interface for sending a signal to the audio system or the display system;
receiving a command from an application at a manager;
using the manager to translate the command from the application into a command for a transport, wherein the manager is a common manager for sending control signals to the first source device and the second source device using one or more transports;
sending a control signal to the first interface using the transport;
extracting metadata files from media files on the first source device and the second source device, wherein the metadata files are automatically extracted from the first or second source device in response to establishing the communications link with the first source device or establishing the communications link with the second source device;
storing the metadata in a single database stored locally in memory of a control system of the vehicle including the first interface and the manager;
cataloging metadata into an aggregated list using a processor of the control system;
providing the aggregated list to the first interface for display to a user such that the user is presented with metadata corresponding to the media files on both the first source device and the second source device; and
automatically updating the aggregated list in response to (i) establishing the communications link with the first source device at a second or later time and (ii) a change in the media files stored in the first source device.

9. The system of claim 1, wherein the memory unit further includes computer code for:
receiving a selection associated with a metadata file in the displayed aggregated list to conduct an activity;
determining which source device the selected metadata file is associated with using an identifier; and
accessing the source device associated with the selected metadata file to conduct the activity.

10. The method of claim 8, further comprising:
receiving a selection associated with a metadata file in the displayed aggregated list to conduct an activity;
determining which source device the selected metadata file is associated with using an identifier; and
accessing the source device associated with the selected metadata file to conduct the activity.

* * * * *

UNITED STATES PATENT AND TRADEMARK OFFICE
CERTIFICATE OF CORRECTION

PATENT NO. : 9,587,958 B2
APPLICATION NO. : 12/524154
DATED : March 7, 2017
INVENTOR(S) : Campbell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this
Twenty-fifth Day of September, 2018

Andrei Iancu
*Director of the United States Patent and Trademark Office*